(12) United States Patent
Kim et al.

(10) Patent No.: US 8,633,903 B2
(45) Date of Patent: Jan. 21, 2014

(54) LARGE SIZE CAPACITIVE TOUCH SCREEN PANEL

(75) Inventors: Hyoung Rae Kim, Hwasung-si (KR); Yoon Kyung Choi, Yongin-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 854 days.

(21) Appl. No.: 12/635,870

(22) Filed: Dec. 11, 2009

(65) Prior Publication Data

US 2010/0156795 A1  Jun. 24, 2010

(30) Foreign Application Priority Data

Dec. 23, 2008 (KR) .................. 10-2008-0132252

(51) Int. Cl.
*G06F 3/041* (2006.01)
(52) U.S. Cl.
USPC .......................... 345/173; 345/103
(58) Field of Classification Search
None
See application file for complete search history.

(56) References Cited

U.S. PATENT DOCUMENTS

| | | | |
|---|---|---|---|
| 5,731,979 A | 3/1998 | Yano et al. | |
| 7,158,123 B2* | 1/2007 | Myers et al. | 345/173 |
| 7,995,041 B2* | 8/2011 | Chang | 345/173 |
| 8,212,785 B2* | 7/2012 | Min et al. | 345/173 |
| 8,264,427 B2* | 9/2012 | Sukurai | 345/76 |
| 2006/0161870 A1* | 7/2006 | Hotelling et al. | 715/863 |
| 2006/0197753 A1* | 9/2006 | Hotelling | 345/173 |
| 2007/0139355 A1* | 6/2007 | Ryuh et al. | 345/103 |
| 2007/0198936 A1* | 8/2007 | Kim | 715/744 |
| 2007/0257890 A1* | 11/2007 | Hotelling et al. | 345/173 |
| 2008/0198140 A1* | 8/2008 | Kinoshita et al. | 345/173 |
| 2009/0079699 A1* | 3/2009 | Sun | 345/173 |
| 2009/0167714 A1* | 7/2009 | Kao et al. | 345/173 |
| 2009/0267916 A1* | 10/2009 | Hotelling | 345/174 |
| 2010/0020027 A1* | 1/2010 | Park et al. | 345/173 |

FOREIGN PATENT DOCUMENTS

| | | |
|---|---|---|
| CN | 101203821 A | 6/2008 |
| CN | 101226451 | 7/2008 |
| JP | 08234909 A | 9/1996 |
| JP | 09134368 A | 5/1997 |
| JP | 2000200143 A | 7/2000 |

OTHER PUBLICATIONS

Chinese Office Action Dated June 5, 2013 Cited in Related Chinese Patent Application No. 200910263621.8.

* cited by examiner

*Primary Examiner* — Dismery Mercedes
(74) *Attorney, Agent, or Firm* — Volentine & Whitt, PLLC

(57) ABSTRACT

A capacitive touch screen panel (TSP) includes multiple TSP sections assembled in a planar arrangement to provide a unitary user interface area. Each one of the TSP sections is configured for independent activation/deactivation with respect to other TSP sections.

17 Claims, 20 Drawing Sheets

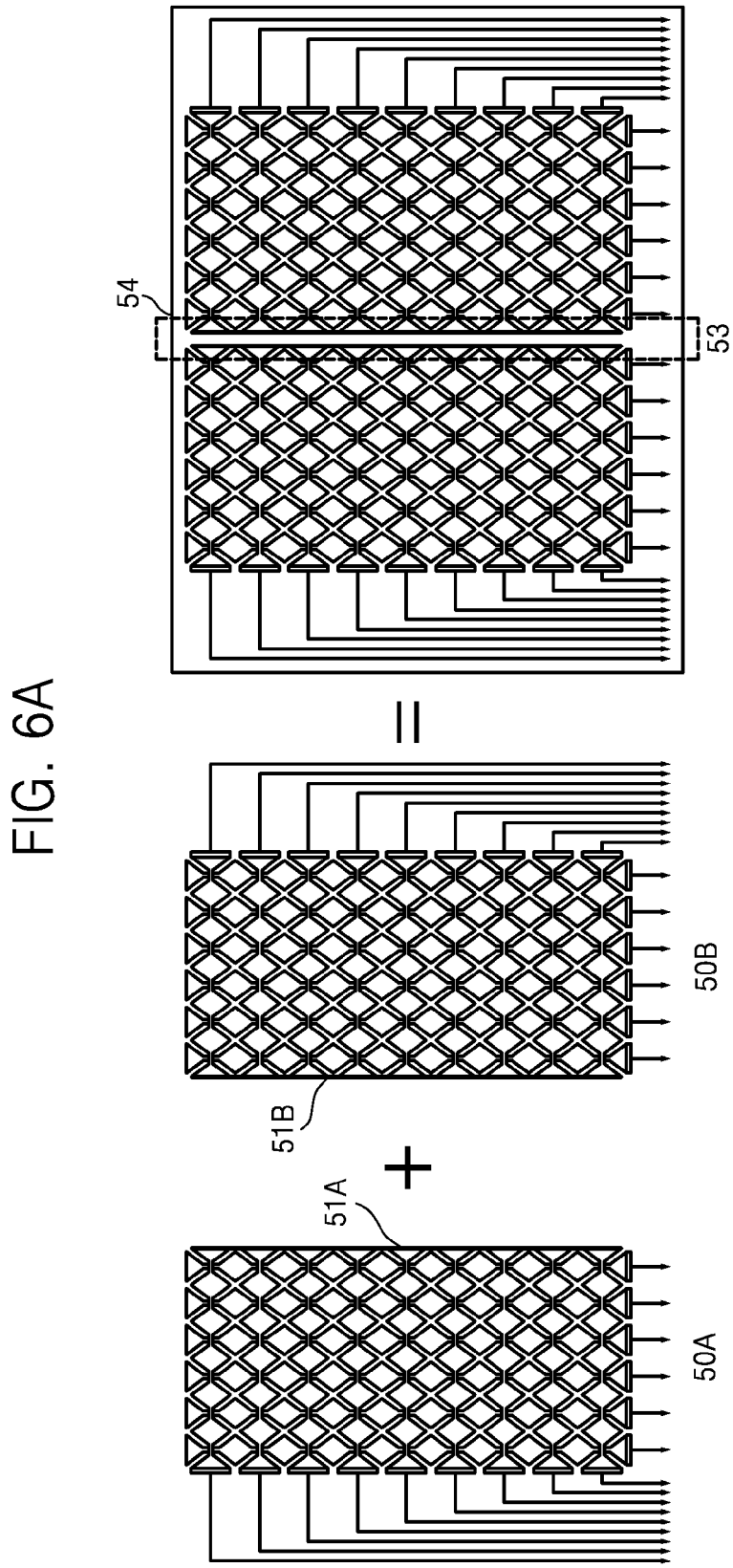

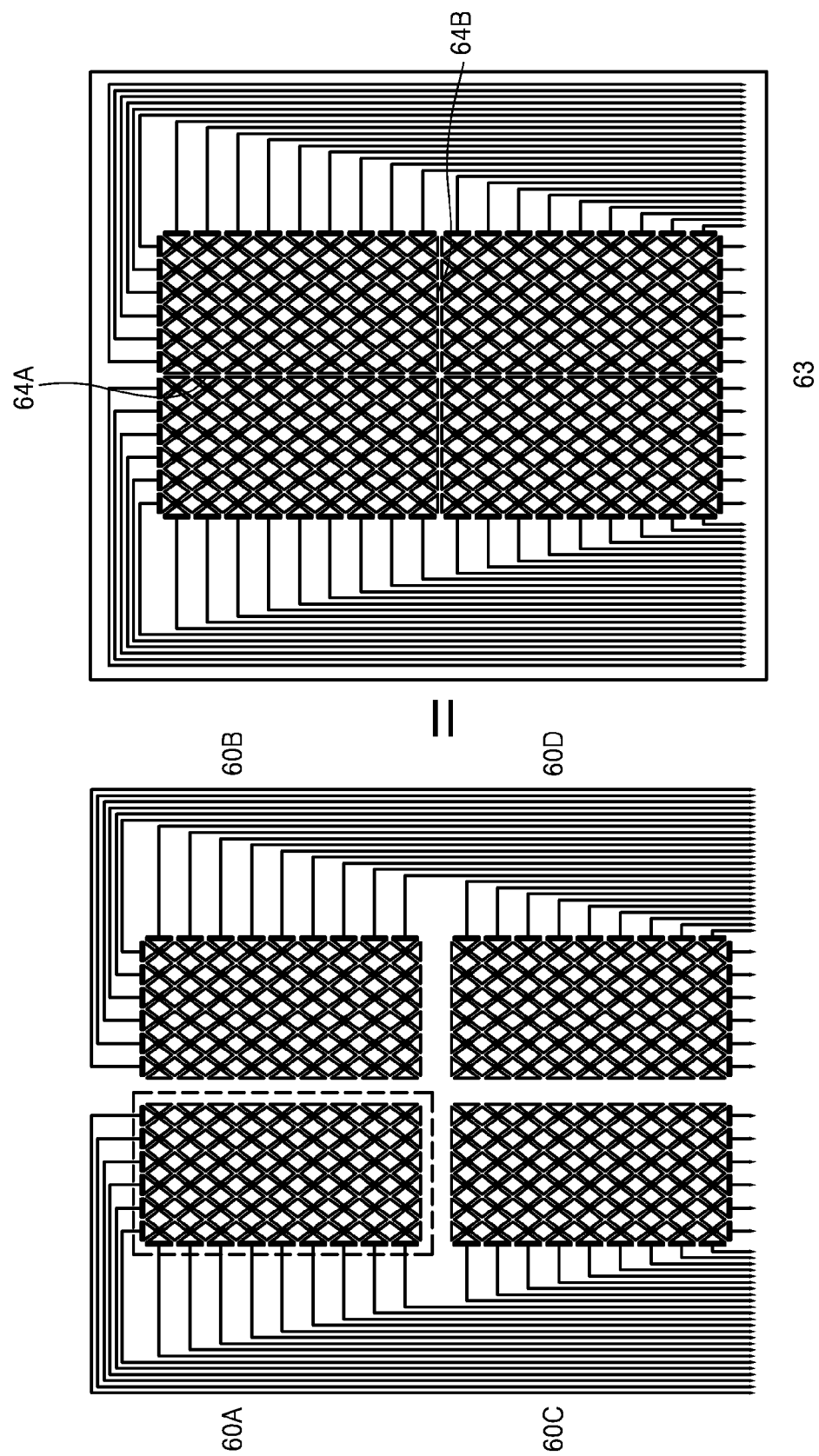

FIG. 10
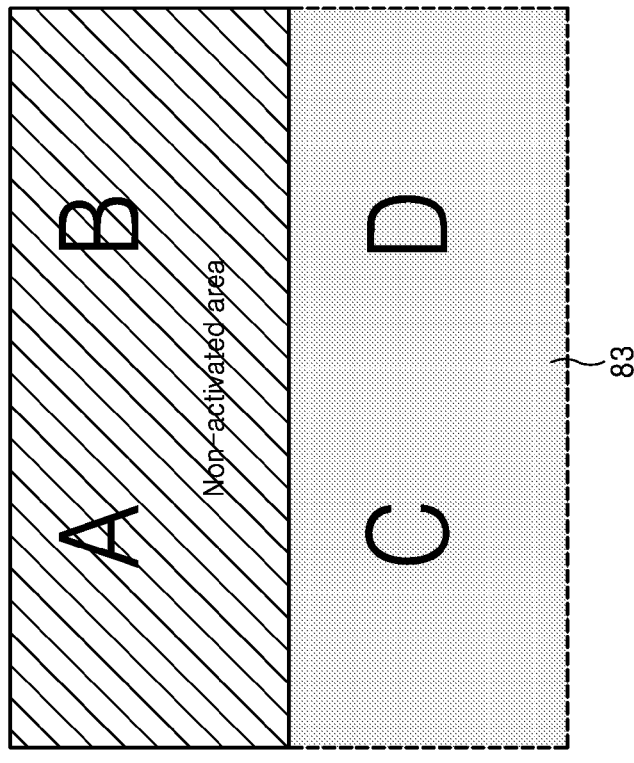
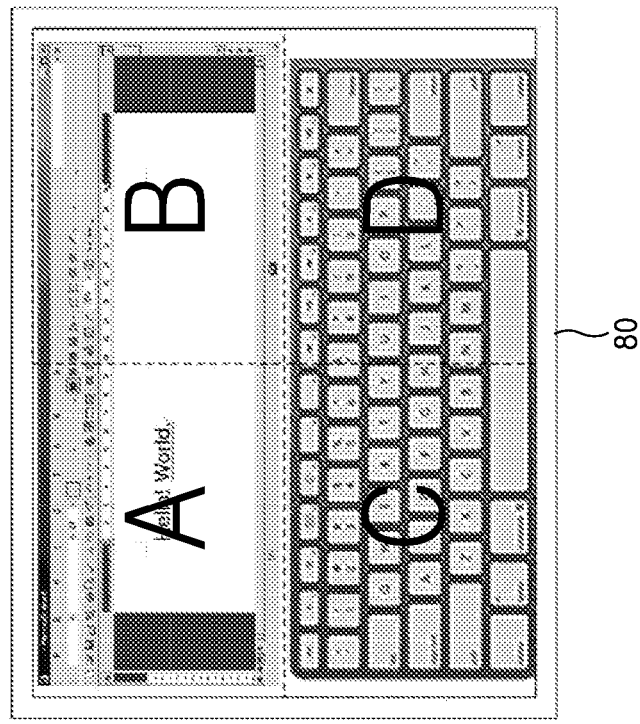

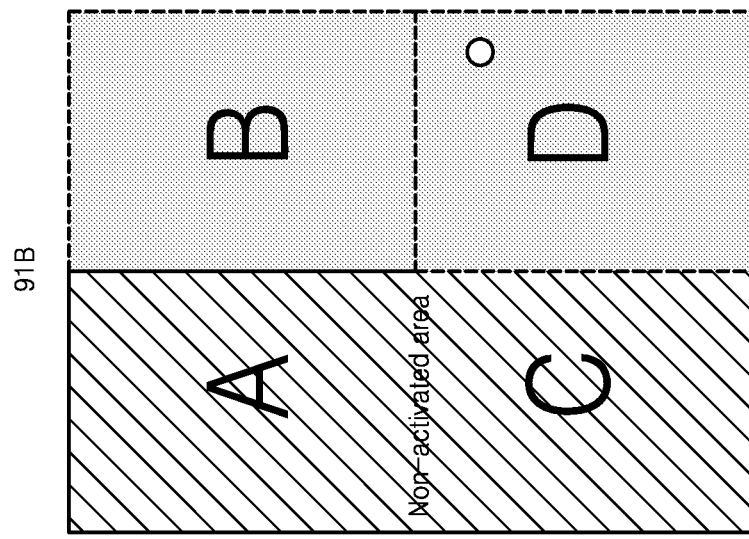
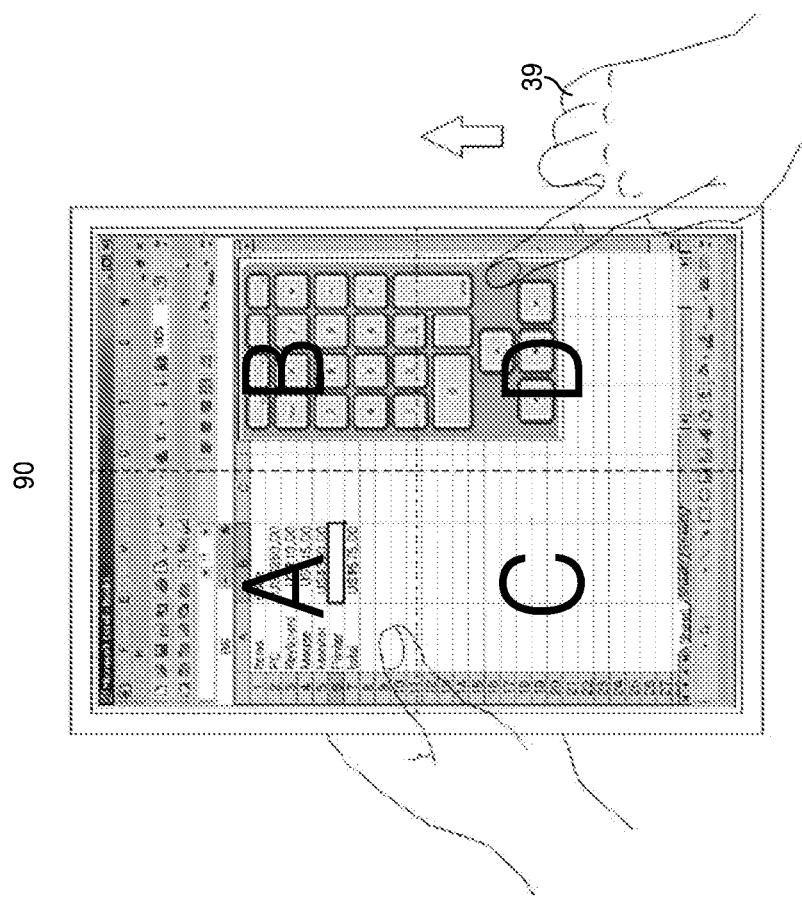
FIG. 11B

LARGE SIZE CAPACITIVE TOUCH SCREEN PANEL

CROSS-REFERENCE TO RELATED APPLICATION

This U.S. non-provisional patent application claims priority under 35 U.S.C. §119 to Korean Patent Application No. 2008-0132252 filed Dec. 23, 2008, the subject matter of which is hereby incorporated by reference.

BACKGROUND

The present disclosure relates to display devices and more particularly to display devices having touch screens.

User interface accessories for consumer electronics have migrated from conventional keyboards and similar hardware peripherals to so-called "virtual" user interfaces. The conventional keyboard is implemented using a resistance matrix fitted under an arrangement of mechanical buttons. The actuation of a selected mechanical button generates a unique row/column signal that is interpreted as a letter, number, or control function. While the conventional keyboard has been widely accepted in commercial use, it suffers from a number of limitations such as large size and inflexibility of application. These limitations are particularly manifest in relation to emerging electronic devices which are generally smaller and more portable than their commercial predecessors. As a result, virtual keyboards and other types of virtual user interfaces are increasingly incorporated into contemporary electronic devices, such as laptop Personal Computers (PCs), Personal Digital Assistants (PDA), tablet PCs, mobile phones, MP3 players, GPS navigators, etc.

Virtual user interfaces may be implemented using a number of different technologies, including, for example, resistive, capacitive, optical, inactive, infrared and surface acoustic wave. One particularly advantageous approach to the implementation of virtual user interfaces is the capacitive touch screen panel (TSP).

Capacitive TSPs enjoy performance and implementation benefits over competing technologies. Capacitive TSPs are highly stable, allow high data throughput, and enable multiple input modes of data input. Published U.S. Patent Publication 2007/0273560 describes one example of a capacitive TSP and is hereby incorporated by reference.

Referring to Figure (FIG. 1, a conventional touch screen panel (TSP) 10 includes a touch screen 4 overlaying a top plate 2. The touch screen 4 includes row and column elements coupled to corresponding sensor lines 6 and respective X/Y sensing circuits. A horizontally oriented parasitic capacitance 8 exists between adjacent sensor lines. A vertically oriented parasitic capacitance 9 exists between sensor lines 6 and top plate 2. A sensing capacitance 5 is developed between a conductive object 7 (e.g., a user's finger or stylus) and proximate sensor lines 6. This sensing capacitance 5 may be detected and subsequently interpreted by circuitry within the TSP 10 as a user input selection (i.e., a letter, number or control function).

Despite the many benefits afforded by capacitive TSPs, they suffer from several implementation and operational difficulties, such as an inability to recognize highly detailed input data (i.e., a limited ability to discriminate small aspect writing or symbol input), a high sensitivity to ambient noise, and physical size limitation.

As shown in FIG. 2, the physical size of a TSP may be generally expressed in terms of a diagonal dimension value "d". Contemporary capacitive TSPs are limited to a physical size no greater than about ten (10) inches.

As is conventionally understood, the capacitive TSP of FIG. 2 includes a sensor array 20 of individually configured sensor elements 23 arranged in a defined matrix of rows and columns. The capacitive TSP may be formed from an indium thin oxide (ITO) material and the plurality of sensor elements 23 may be arranged in a diamond pattern within the sensor array 20. The capacitive TSP includes so-called Y-direction conductive lines 22 and X-direction conductive lines 24, respectively communicating user input data from the capacitive TSP to related computational circuitry.

Throughout the written description of this disclosure, certain terms like "horizontal" and "vertical", or "X-direction" and "Y-direction" are used as relative geometric terms in conjunction with the accompanying drawings. Those skilled in the art will recognize that such terms are merely descriptive and are not intended to mandate some arbitrary layout of elements. Such terms are, however, useful in describing exemplary arrangements of elements in relation to the principle physical plane formed by the touch screen panel. Accordingly, the foregoing terms describe possible inter-elements geometries but do not mandate the particular layout orientation suggested by the accompanying drawings.

The relatively small, maximum size of conventional capacitive TSPs is a function of practical signal sensitivity limitations. As the length of the constituent row and column signal lines increases with an overall increase the physical size of the capacitive TSP, the number of sensor elements connected to each signal line also increases. The combination of additional noise and signal line impedance resulting from the increased number of connected sensor elements and the added length of the constituent signal line ultimately makes it difficult to accurately interpret user input data. As a result, capacitive TSPs have heretofore been limited to applications requiring only a relatively small display sizes.

SUMMARY

In accordance with illustrated embodiments of the inventive concept, certain methods and apparatuses are provided which allow the overall physical size of a capacitive touch screen panel (TSP) to be markedly increased over those realized by conventional design and implementation approaches.

According to one embodiment of the inventive concept, there is provided a capacitive touch screen panel (TSP), comprising; a plurality of TSP sections assembled in a planar arrangement to provide a unitary user interface area, wherein each one of the plurality of TSP sections is configured for independent activation/deactivation with respect to other ones of the plurality of TSP sections.

According to another embodiment of the inventive concept, there is provided a capacitive TSP comprising a unitary user interface area having a first width, the capacitive TSP comprising; a plurality of TSP sections assembled in a planar arrangement to provide the unitary user interface area, wherein each one of the plurality of TSP sections has a second width less than the first width, the second width being substantially equal to or less than a maximum touch sensing signal driving distance for a row line extending across the respective TSP section.

According to another embodiment of the inventive concept, there is provided a method of receiving user-defined touch data in a system comprising a capacitive touch screen panel (TSP) incorporating a plurality of TSP sections assembled in a planar arrangement to provide a unitary user interface area, the method comprising; receiving input data defining a first region of permissible user touch input within the unitary user interface area, and activating a first TSP section within the plurality of TSP sections in response to the definition of the first region of permissible user touch input.

According to another embodiment of the inventive concept, there is provided a large size capacitive touch screen panel (TSP), comprising; a plurality of TSP sections assembled in a planar arrangement to provide a unitary user interface area, wherein each one of the plurality of TSP sections is configured for independent activation/deactivation with respect to other ones of the plurality of TSP sections, a plurality of sensing units each respectively associated with one of the plurality of TSP sections and configured to provide sense information responsive to user touch data entered via the associated one of the plurality of TSP sections, a power supply unit applying power to each one of the plurality of TSP sections in response to control signals received from a TSP control unit, an analog-to-digital converter configured to receive sense information from the plurality of sensing units and generate corresponding digital sense data, and a signal processing unit configured to receive the sense data and after processing pass the sense data to the TSP control unit.

BRIEF DESCRIPTION OF THE DRAWINGS

Exemplary embodiments of the inventive concept will be more clearly understood from the following detailed description taken in conjunction with the accompanying drawings in which:

FIGS. 6A and 6B illustrate capacitive TSPs assembled from respective pluralities of TSP sections in accordance with other embodiments of the inventive concept.

FIGS. 7A and 7B illustrate capacitive TSPs assembled from respective pluralities of TSP sections in accordance with other embodiments of the inventive concept.

FIG. 10 illustrates a capacitive TSP assembled from a plurality of TSP sections in accordance with an embodiment of the inventive concept and displaying a virtual keyboard.

DESCRIPTION OF EMBODIMENTS

Reference will now be made to certain embodiments illustrated in the accompanying drawings. Throughout the drawings and written description, like reference numbers and labels are used to indicate like or similar elements and features.

It should be noted that the present inventive concept may be embodied in many different forms. Accordingly, the inventive concept should not be construed as limited to only the illustrated embodiments. Rather, these embodiments are presented as teaching examples.

Those skilled in the art will recognize that enumerating terms (e.g., first, second, etc.) are used merely to distinguish between various elements. These terms do not define some numerical limitation on such elements.

As used herein, the term "and/or" includes any and all combinations of one or more of the associated listed elements. It is further understood that when an element is said to be "connected" or "coupled" to another element, it may be directly connected or coupled to the other element, or intervening elements may be present. In contrast, when an element is referred to as being "directly connected" or "directly coupled" to another element, no material intervening elements will be present. Other words used to describe element relationships should be interpreted in a like fashion (e.g., "between" versus "directly between," "adjacent" versus "directly adjacent," etc.).

Unless otherwise defined, all terms (including technical and scientific terms) used herein have the same meaning as commonly understood by one of ordinary skill in the art. It is further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3:
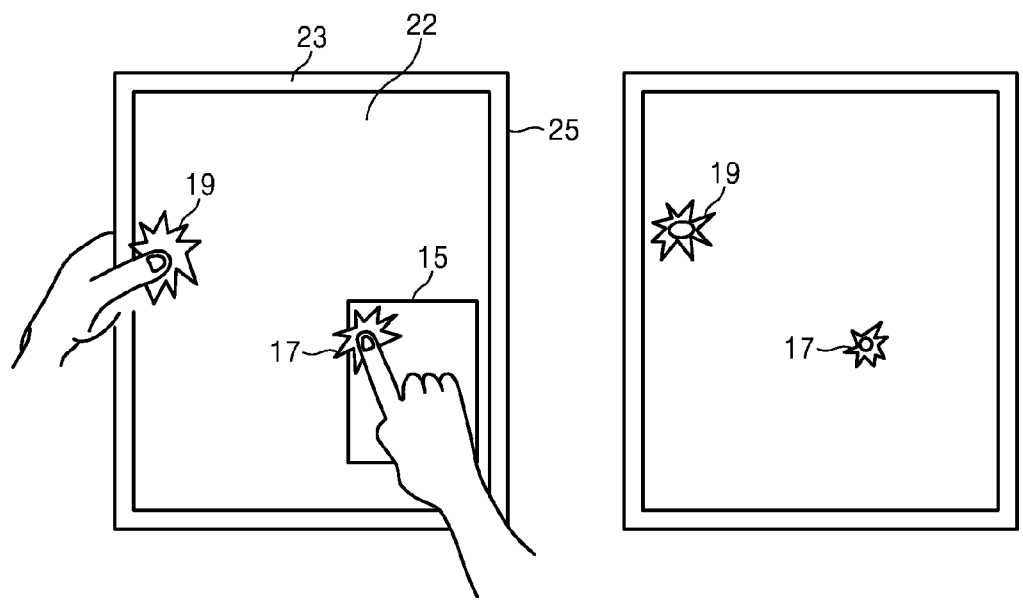
FIG. 3 is a conceptual diagram illustrating the problem of intentional verse unintentional touch data inputs in a capacitive TSP.

FIG. 3 illustrates several operational and design considerations distinguishing embodiments of the inventive concept from conventional implementations of a capacitive touch screen panel (hereafter, "TSP"). In FIG. 3, a user grips a tablet PC 25 incorporating a TSP with one hand while entering data via a graphical user interface 15 (GUI) with the index finger of the other hand. The tablet PC 25 illustrated here is one example of a multitude of electronic devices potentially incorporating a capacitive TSP according to an embodiment of the inventive concept. The tablet PC 25 provides a unitary user interface area 22 through which (and across the length and breath of which) the user may enter touch data in relation to images displayed on the display underlying the capacitive TSP.

The term "touch data" is a term used to broadly denote any user-defined input communicated via a capacitive TSP. Touch data may be generated using a number of different user input devices (i.e., a finger or stylus), and may be received and interpreted by a variety of capacitive TSP designs and associated circuitry. Selected examples of capacitive TSPs and associated touch data detection and interpretation circuitry are disclosed in published U.S. Patent Application 2007/0273560, the subject matter of which is hereby incorporated by reference.

The GUI 15 displayed on the tablet PC 25 may take any practical form. Virtual keyboards, number pads, directories, list menus, etc., may be displayed and functionally used as one or more GUI(s) by the tablet PC 25. The term "GUI" as used in the subject disclosure encompasses any image (fixed, moving, or movable) that is visually displayed in conjunction with a capacitive TSP and intended for user interaction to define and/or receive touch data.

The "unitary user interface area" 22 provided by the tablet PC 25 defines an unbroken (i.e., operatively non-segmented) working area through which touch data may be homogenously entered by a user. That is, any point (or physical location) within the unitary user interface area 22 may be functionally configured by the tablet PC 25 to receive touch data. For example, the entire rectangular area shown in FIG. 3 as the unitary user interface area 22 may be manipulated to display some portion of a GUI adapted to receive user-defined touch data. Further, the entire rectangular area forming unitary user interface 22 may receive touch data in a seamless, non-positionally distinctive manner. In contrast, the plastic or metal boundary 23 surrounding the unitary user interface area 22 is not capable of receiving touch data, although it may be used to incorporate mechanical or electrical devices (e.g., switches, buttons, plugs, ports, outlets).

Figure 1:
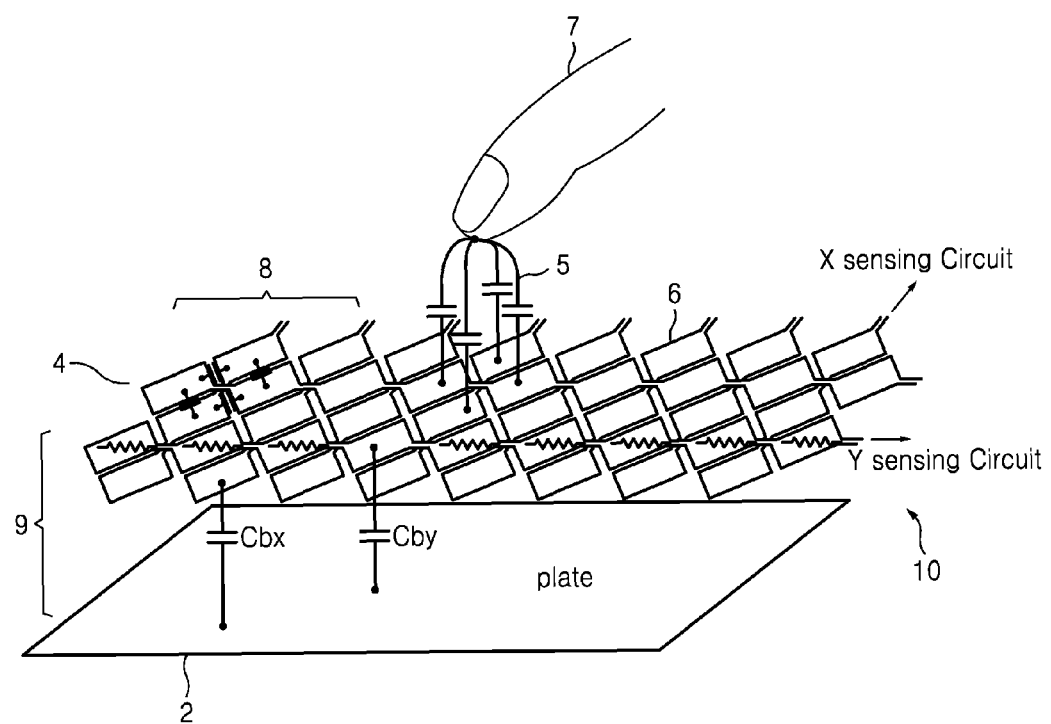
FIG. 1 is a schematic view of a conventional, capacitive touch screen panel (TSP).
Figure 2:
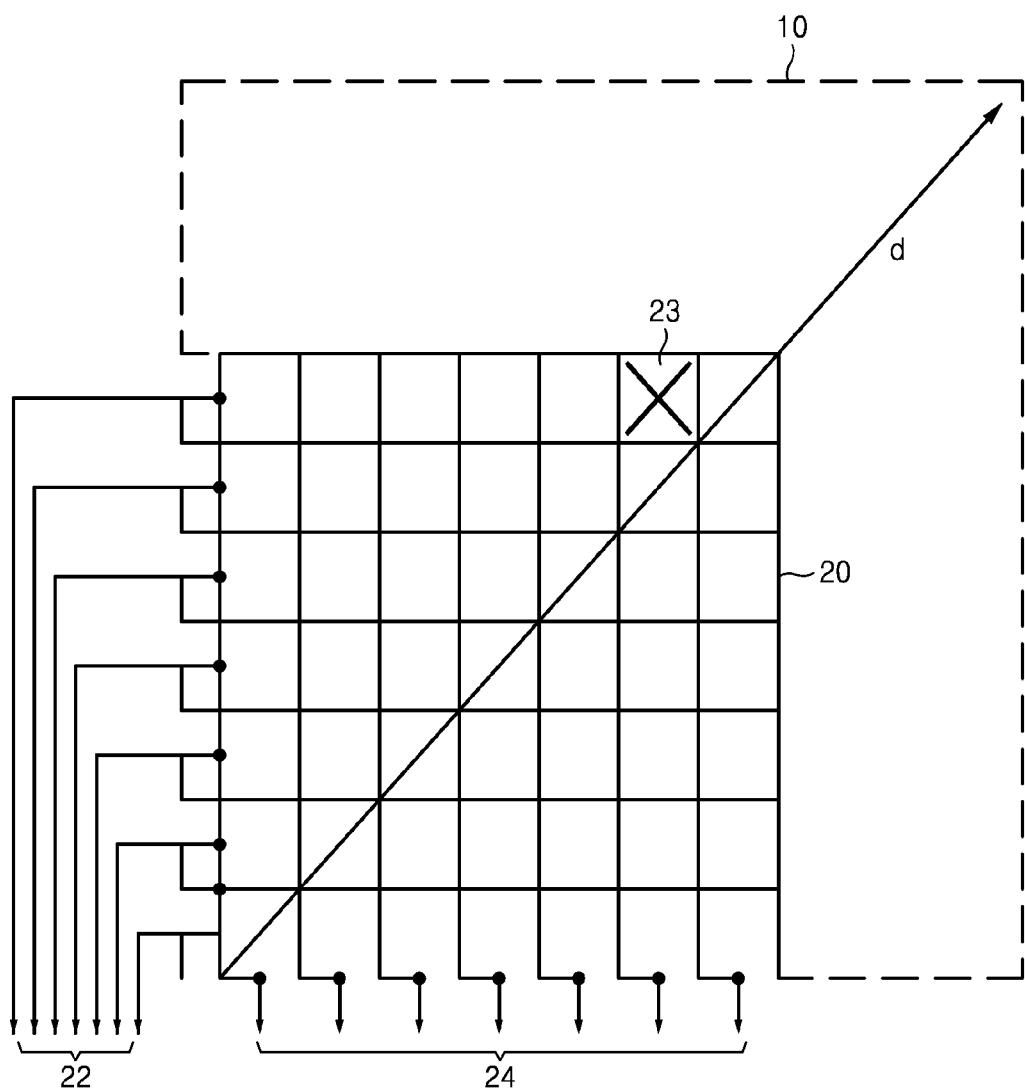
FIG. 2 is another schematic view of the conventional TSP further illustrating the constituent sensor array and X/Y conductive lines.

Embodiments of the inventive concept may be drawn to many types of electronic host devices, each having different form factors, mechanical-electrical layouts, and layout geometries. However, each host device incorporating a capacitive TSP according to an embodiment of the inventive concept will provide some form of unitary user interface area 22. In various operative modes, the unitary user interface area 22 may be "sized" within a maximum display field provided by the capacitive TSP. Thus, each unitary user interface area 22 provided within a particular host device may be said to have a maximum size defined by the maximum diagonal dimension value "d" associated with the capacitive TSP incorporated into the host device (See, FIG. 2). In many host devices, the maximum size of the unitary user interface area 22 provided by the capacitive TSP is an important design and implementation consideration, as well as an important selling point to potential customers.

Returning to FIG. 3, a first location 17 within the visually defined boundaries of GUI 15 in the illustrated embodiment is an appropriate data entry point for user-provided touch data. The first location 17 may thus be referred to as a location receiving an intended touch. The term "intended touch" means any intentional capacitive user-interaction defining coherent touch data. In contrast, an "unintended touch" is an accidental or incidental contact by a user or something in the user's environment with a capacitive TSP that potentially defines or generates erroneous, incoherent, or undesired touch data. The gripping thumb of the left hand in FIG. 3 at a second location 19 is an example of an unintended touch, since it occurs outside of the GUI 15—the only GUI assumed to be currently operative in the tablet PC 25.

One of the well-known difficulties associated with the use of capacitive TSPs in facilitating the definition and receipt of user-defined touch data is the ever present possibility of erroneous touch data being generated by an unintended touch. Thus, any competent capacitive TSP must provide some ability to discriminate between unintended touches and intended touches. This discrimination ability is particularly challenging when, as is the case in FIG. 3, the unintended touch at second location 19 occurs coincident to the intended touch at first location 17. This discrimination ability is further challenged by the emerging requirement within certain host devices to simultaneously recognize multiple intended touches while still identifying coincident unintended touches.

Different technical approaches have been postulated that address the discrimination requirements of capacitive TSPs in dealing with unintended touches verses intended touches, including simultaneously applied multiple intended touches. See, for example, published U.S. Patent Application 2007/0257890, the subject matter of which is incorporated by reference. Unfortunately, these conventional technical approaches are characterized by computationally intensive calculations that slow performance of the host device incorporating a capacitive TSP.

Embodiments of the inventive concept provide larger sized capacitive TSPs capable of reducing or eliminating the number of unintended touches that must be successfully identified and discriminated during operation of a constituent host device. The larger sized capacitive TSPs provided by embodiments of the inventive concept also yield a markedly larger maximum unitary user interface area than capacitive TSPs realized by conventional design and manufacturing techniques.

Figure 4:
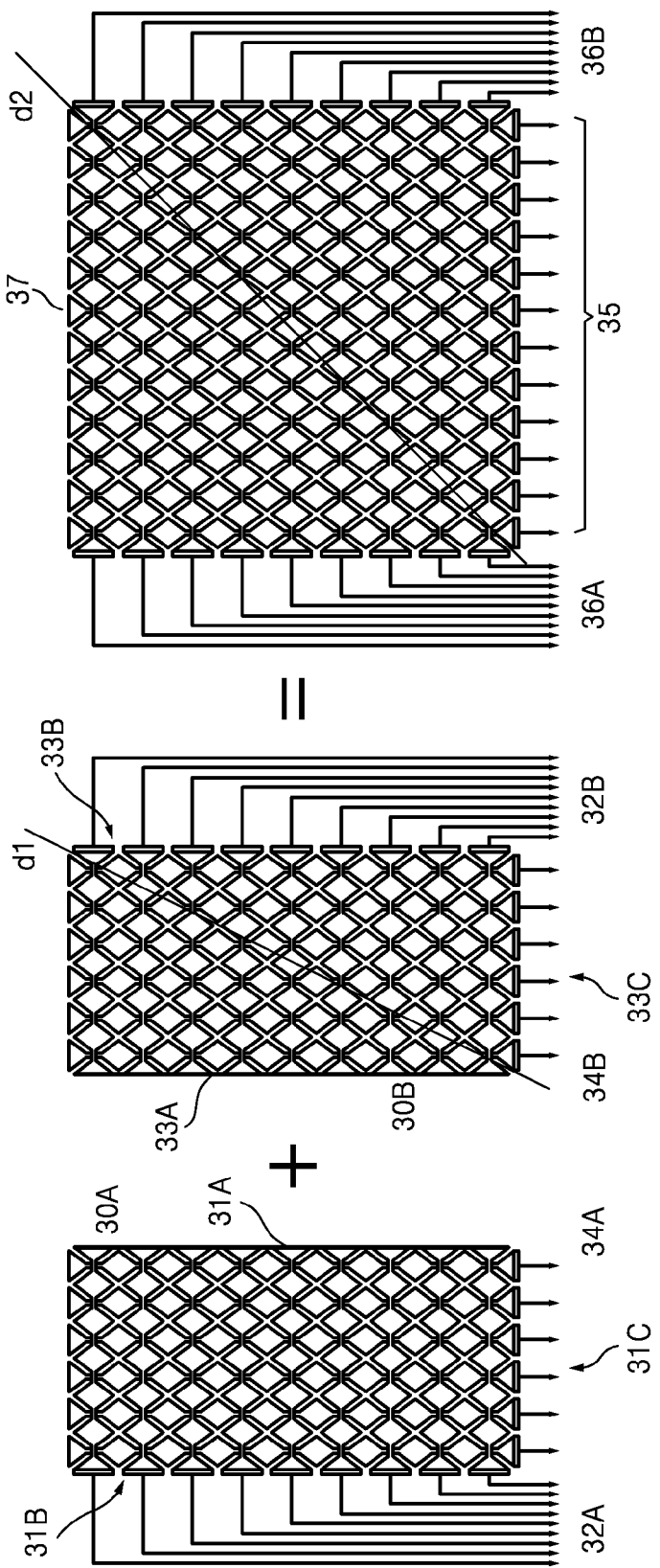
FIG. 4 illustrates a capacitive TSP assembled from a plurality of TSP sections in accordance with an embodiment of the inventive concept.

FIG. 4 is an illustration of a capacitive TSP according to an embodiment of the inventive concept. The capacitive TSP 33 includes a plurality of TSP sections (30A and 30B) assembled in a planar arrangement, such that a much larger maximum unitary user interface is provided, as compared with conventional capacitive TSPs. The term "planar arrangement" is used to denote a mechanical and/or electrical assembly that defines a principle X/Y field or plane defining the unitary user interface area that is characteristic of all capacitive TSPs. Throughout the description that follows, rectangular planar arrangements are illustrated since such are consistent with current commercial appetites. However, non-rectangular arrangements formed by TSP sections having non-rectangular shapes might also be realized in other embodiments of the inventive concept. Further, the plurality of TSP sections forming a capacitive TSP according to the illustrated embodiments of the inventive concept need not be similarly sized or similar in layout geometry, but similarly sized TSP sections are used to illustrate examples of the inventive concept hereafter.

In certain embodiments of the inventive concept, each one of the plurality of TSP sections (e.g., 30A, 30B) may be generally implemented using conventionally understood fabrication techniques, such as those used to implement conventional capacitive TSPs. However, each TSP section forming a capacitive TSP according to an embodiment of the inventive concept will include at least one terminal edge adapted for assembly with the terminal edge of another TSP section.

In FIG. 4, a first TSP section 30A comprises one "terminal edge" 31A and two "active edges" 31B and 31C. The two active edges 31B and 31C of first TSP section 30A respectively allow some form of electrical connection with the constituent row lines and/or column lines. For example, in FIG. 4, the vertical active edge 31B of first TSP section 30A enables respective connection of constituent row lines via corresponding connection structures with one of a plurality of conductive Y-direction lines 32A. Thus, signal transfer may be performed through the vertical active edge 31B of the first TSP section 30A to conventionally understood signal processing circuitry (not shown).

In similar manner, the horizontal active edge 31C of first TSP section 30A allows respective connection of constituent column lines via corresponding connection structures with one of a plurality of conductive X-direction lines 34A. Thus, signal transfer may also be performed through the horizontal active edge 31C of the first TSP section 30A to related signal processing circuitry. In this context, any reasonable number of conventionally understood connection structures (e.g., conductive input/output (I/O) pads) and/or related I/O circuits may be used to facilitate the transfer of signals from external signal processing circuitry via conductive X/Y direction lines to row/column lines of a capacitive TSP according to an embodiment of the inventive concept.

In contrast, the vertical terminal edge 31A of the first TSP section 30A does not enable the transfer of "active signals" (e.g., signals communicating touch data). Thus, while a terminal edge may include certain components associated with row/column lines (e.g., passive termination components), and may further include connection structures facilitating the connection of passive electrical signals (e.g., ground of power supply voltages), it will not include connection structures or components enabling the transfer of active electrical signals, such as those subsequently processed to provide touch data, and will not enable the connection of conductive X/Y direction signal lines.

A terminal edge from one TSP section is primarily intended to mechanically mate during an assembly process with an opposing terminal edge of another TSP section. Thus, the term "terminal edge" denotes an edge of one TSP section adapted for mechanical assembly with the terminal edge of another TSP section. One principal function of terminal edges is the "seamless assembly" of the plurality of TSP sections forming the capacitive TSP according to an embodiment of the inventive concept. Seamless assembly means a mechanical and/or electrical assembly that yields a maximum sized, unitary user interface area, or a maximum user-workable field without physical interruption or boundary between TSP sections, such that a broad or sweeping user gesture across the entire field does not result in touch data generation or user perception of touch data generation that is materially different from a smaller user gesture across only a single constituent TSP section. Given this particular function, a terminal edge should be as mechanically unobtrusive and electrically unencumbered as reasonably possible.

Returning to FIG. 4, a second TSP section 30B comprises an analogous, vertical terminal edge 33A and two X/Y active edges 33B and 33C. The two active edges 33B and 33C of the second TSP section 30B respectively allow respective electrical connection with the constituent row lines and column lines. For example, in FIG. 4, the vertical active edge 33B of the second TSP section 30B allows connection of row lines with a plurality of conductive Y-direction lines 32B. Thus, active signal transfer may be performed through the vertical active edge 33B of the second TSP section 30B. In similar manner, the horizontal active edge 33C of second TSP section 30B allows connection of column lines with a plurality of conductive X-direction lines 34B. Thus, active signal transfer may be performed through the horizontal active edge 33C of the second TSP section 30A.

The large size capacitive TSP 37 of FIG. 4 is implemented by the seamless assembly of the first and second TSP sections 30A and 30B at their respective vertical terminal edges 31A and 31B. The resulting capacitive TSP 37 provides a markedly larger unitary user interface area since the size (i.e., diagonal dimension "d2") of the capacitive TSP 37 is greater than the size (i.e., diagonal dimension "d1") of each individual TSP section 30A and 30B.

Once seamlessly assembled, the capacitive TSP 37 of FIG. 4 comprises vertical active edges 31B and 33B at which a first plurality of Y-direction conductive lines 36A and a second plurality of Y-direction conductive lines 36B are respectively connected. Capacitive TSP 37 also comprises a single horizontal active edge (31C+33C) at which a plurality of X-direction conductive lines 35 are connected. The operative connection of these conductive lines to external signal processing circuitry (e.g., a TSP controller, display controller, and/or host controller, or circuitry associated with a controller) may be conventional in its approach.

Figure 5A:
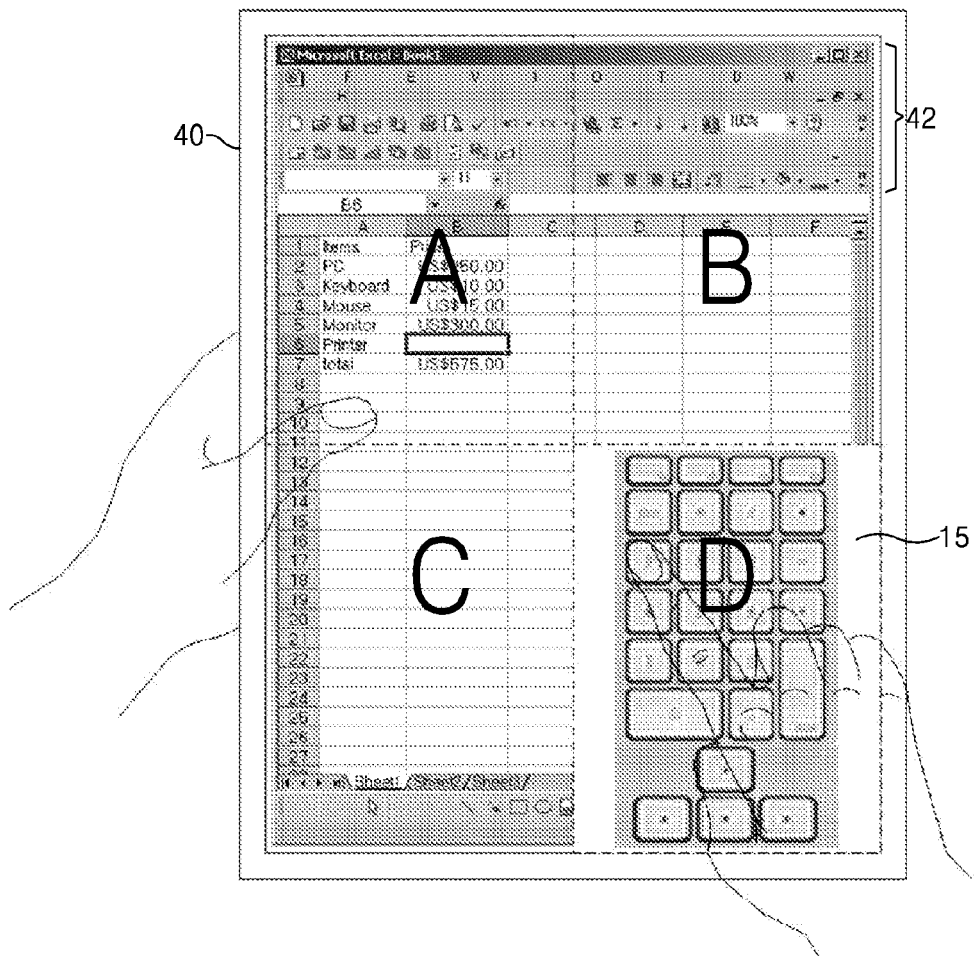
FIG. 5, inclusive of FIGS. 5A, 5B and 5C, illustrates a capacitive TSP assembled from a plurality of TSP sections in accordance with another embodiment of the inventive concept.
Figure 5B:
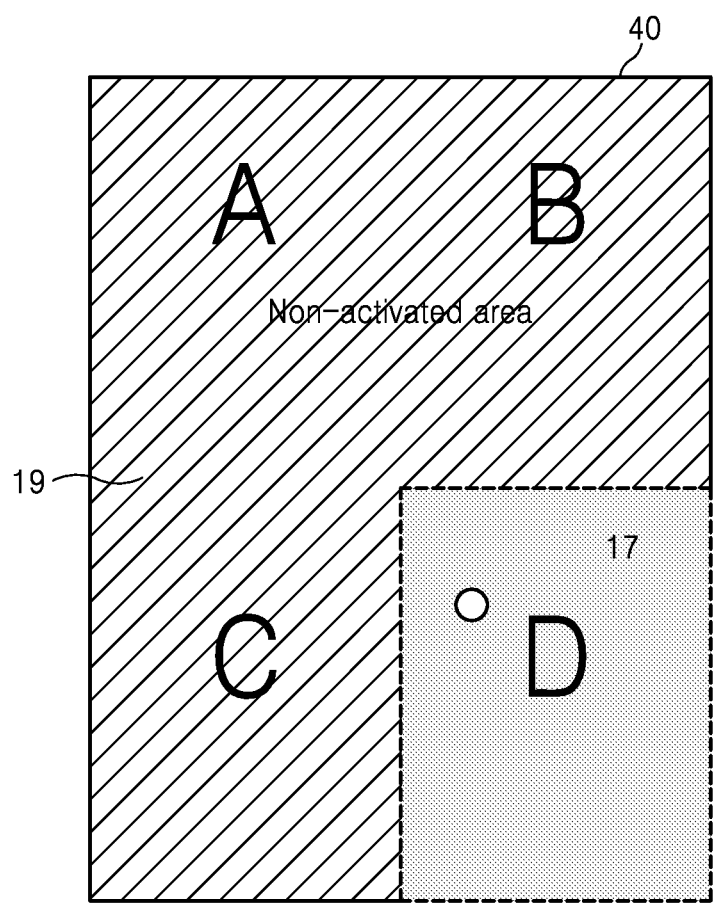
Figure 5C:
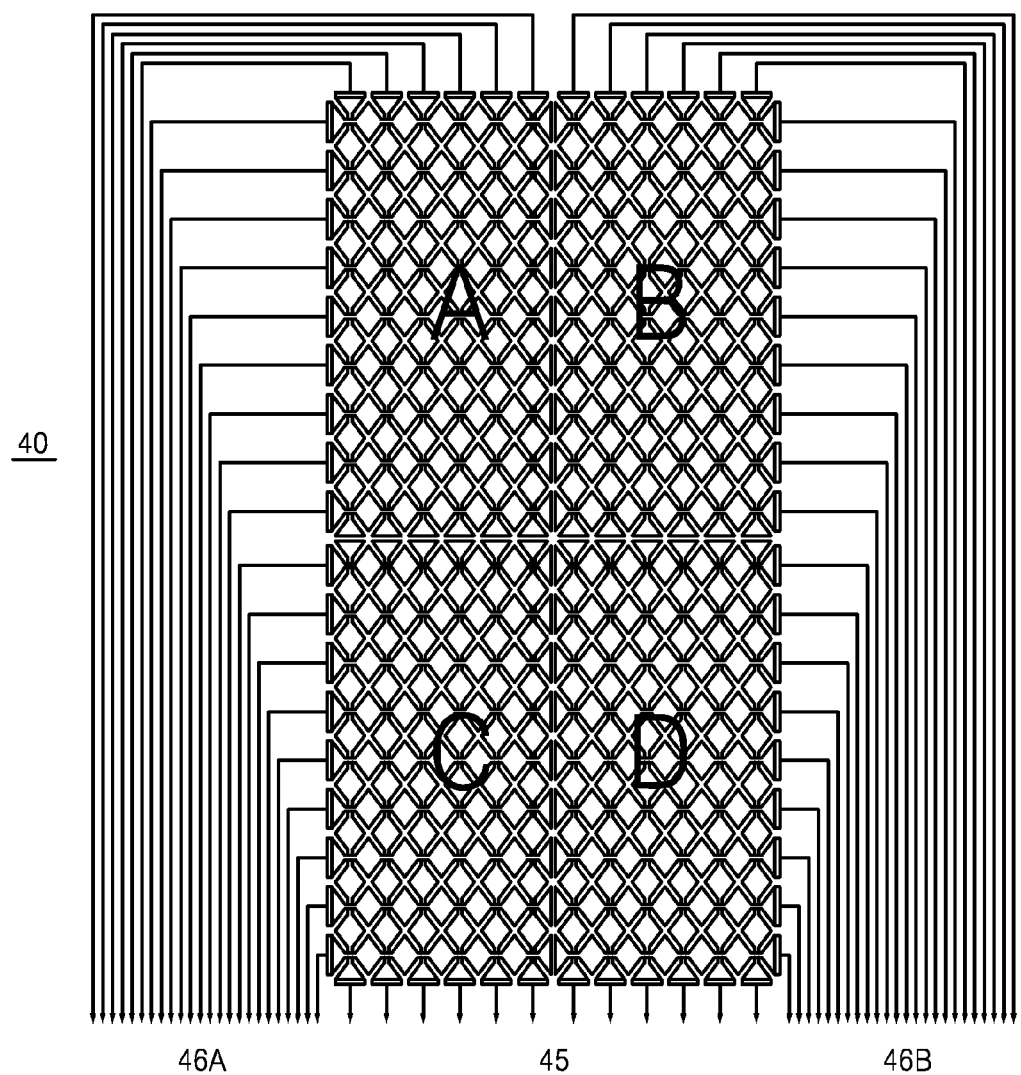

FIG. 5, inclusive of FIGS. 5A, 5B and 5C, illustrates another embodiment of the inventive concept. Here, a capacitive TSP 40 comprises four (4) TSP sections 40A, 40B, 40C and 40D assembled according to the principals described above. For example, first TSP section 40A comprises an outer vertical active edge at which a plurality of Y-direction conductive lines may be connected, an inner vertical terminal edge mated in assembly with a vertical terminal edge of second TSP section 40B, an outer horizontal active edge at which a plurality of X-direction conductive lines may be connected, and an inner horizontal terminal edge mated in assembly with a terminal horizontal edge of third TSP section 40C. The second through fourth TSP sections are analogously implemented.

Once assembled, the capacitive TSP 40 allows conductive line connections at up to four outer active edges. In the illustrated embodiment, separate pluralities of Y-direction and X-direction conductive lines 46A and 46B are arranged along the vertical active edges of the capacitive TSP 40. Another plurality of X-direction conductive lines 45 is arranged at the lower horizontal edge of the capacitive TSP 40.

The quadrature assembly of TSP sections 40A, 40B, 40C and 40D provides an exceptionally large, unitary user interface area extending and as diagonally measured from the lower left corner of third TSP section 40C to the upper right corner of second TSP section 40B. Assuming that each one of the TSP sections 40A, 40B, 40C and 40D has a diagonal dimension "d" of about 10 inches (i.e., the current maximum conventional size), the illustrated embodiment of the inventive concept shown in FIG. 5 provides a maximum unitary user interface that is about twice as large (e.g., "2 d") as the conventional maximum unitary user interface, assuming similar manufacturing techniques and materials are used to fabricate the constituent TSP sections.

Additionally, each one of the plurality of TSP sections 40A, 40B, 40C and 40D forming capacitive TSP 40 may be independently activated and deactivated (hereafter "activation/deactivation") with respect to the other TSP sections. For example, FIG. 5A like FIG. 3 shows a user gripping the capacitive TSP 40 with one hand while entering touch data via GUI 15 with the other hand. This process simultaneously results in an unintended touch at second location(s) 19 associated with the user's gripping thumb, and an intended touch, more likely a sequence of intended touches, or multiple intended touches at the first location(s) 17 within the displayed boundaries of GUI 15. Throughout the extended sequence of intended touches at the first location(s) 17, for example, a conventional capacitive TSP would necessarily be forced to identify and discriminate all of the unintended touches at the second location 19. However, in certain embodiments of the inventive concept, this ongoing and computationally involved identification and discrimination process may be completely omitted.

As illustrated in FIGS. 5A and 5B, for example, the displayed GUI 15 is wholly located within only the fourth TSP section 40D. Accordingly, a controller operatively controlling the capacitive TSP 40 may completely ignore the unintended touches occurring outside of the fourth TSP section 40D. Accordingly, the first through third TSP sections 40A, 40B and 40C may be deactivated as a result of a recognition by the controller (or multiple TSP section controllers) that only the fourth TSP section 40D has a currently active GUI displayed within its boundaries. Hence, all unintended touches at second location(s) 19 associated with the user's gripping hand or thumb within the first TSP section 40A and/or the second TSP section 40C will not detected by the capacitive TSP 40 as possible location(s) at which an intended touch (i.e., a possible source of valid touch data) may occur. In the illustrated embodiment of FIG. 5, only unintended touches potentially occurring within the fourth TSP section 40D need be identified and discriminated from intended touches. At a minimum, this intelligent TSP section activation/deactivation approach—made in response to the displayed location(s) of one or more currently active GUI(s)—will greatly reduce, if not completely eliminate, the requirement to identify and discriminate unintended touches from intended touches occurring outside activated TSP sections.

Further, since only the fourth TSP section 40D needs to be activated in the illustrated embodiment of FIG. 5, power consumption by the capacitive TSP 40 can be dramatically reduced. That is, embodiments of the inventive concept characterized by an intelligent ability to activate/deactivate selected TSP section(s) within a plurality of TSP sections assembled to form a large size capacitive TSP not only enable a reduction in the need to discriminate between intended touches and unintended touches, but also enable a marked reduction in the overall power consumption of the large size capacitive TSP.

The foregoing embodiment activates/deactivates certain TSP sections in relation to the display location(s) of currently active GUI(s). TSP section(s) positionally associated with the displayed GUI location(s) will be activated to receive touch data. TSP section(s) not positionally associated with displayed GUI location(s) will be deactivated or will remain deactivated. In a related aspect, each activated TSP section receives power while deactivated TSP sections do not receive power or have applied power interrupted.

Other embodiments of the inventive concept may activate/deactivate selected TSP section(s) in relation to additional and/or other user-defined actions (i.e., other than or in addition to displayed GUI location(s)).

As an application is executed by a host device incorporating a capacitive TSP according to an embodiment of the inventive concept, various GUIs may be flexibly displayed in both location and time to allow user-defined touch data to be received. For example, a first command menu GUI may be replaced during application execution by a second virtual keyboard GUI which may later be joined during application execution by a third number-pad GUI. As different GUIs are displayed for use, various TSP sections may be activated/deactivated per the foregoing description. In this manner, power is conserved and the computational requirements necessary to discriminate unintended touches from intended touches may be reduced.

Figure 6B:
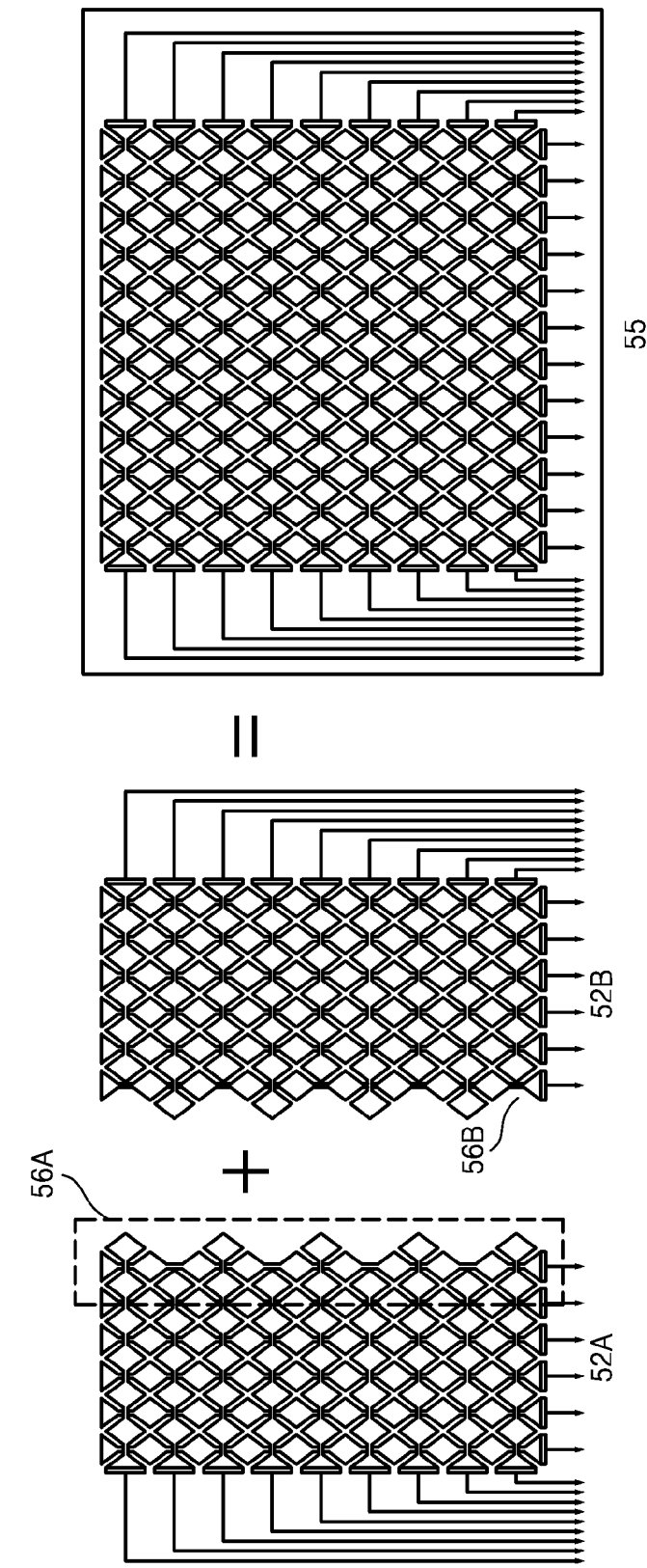

The physical composition and nature of the terminal edge(s) mated during assembly of the TSP sections to form a large size capacitive TSP warrants some additional consideration at this point. FIGS. 6A and 6B show two different types of vertical terminal edges. Like FIG. 4, the embodiment of the inventive concept illustrated in FIG. 6A comprises two (2) TSP sections 50A and 50B having respective "linear", terminal vertical edges 51A and 51B assembled to form a large size capacitive TSP 53. Depending on the type of material(s) used to fabricate the first and second TSP sections 50A and 50B, a line 54 demarcating the assembly boundary between terminal vertical edges 51A and 51B may be apparent (or faintly apparent) to a user within the unitary user interface area of capacitive TSP 53. While the visual line 54 does not materially interfere with or break the user's ability to enter touch data across the entire unitary user interface area, it may nonetheless be visually unappealing.

Accordingly, the embodiment of the inventive concept shown in FIG. 6B comprises first and second TSP sections 52A and 52B assembled to form a large size capacitive TSP 55 without the objectionable visual line 54. Here, the first and second TSP sections 52A and 52B respectively include non-linear (e.g., a zigzag shaped) vertical terminal edges 56A and 56B that are mated during assembly. The discontinuous (or non-linear) nature of the terminal edges of the first and second TSP sections 52A and 52B inhibits the formation or visual apprehension of a boundary demarcation between mated TSP sections (e.g., a visually apparent line).

The embodiment illustrated in FIG. 7A extends the foregoing teachings to a quadrature assembly of TSP sections 60A, 60B, 60C, and 60D forming a large size capacitive TSP 63. Once again, the linear nature of the mated terminal edges (both vertical and horizontal) between TSP sections 60A, 60B, 60C, and 60D may result in faintly perceivable lines 64A and 64B running vertically and horizontally across capacitive TSP 63.

Figure 7B:
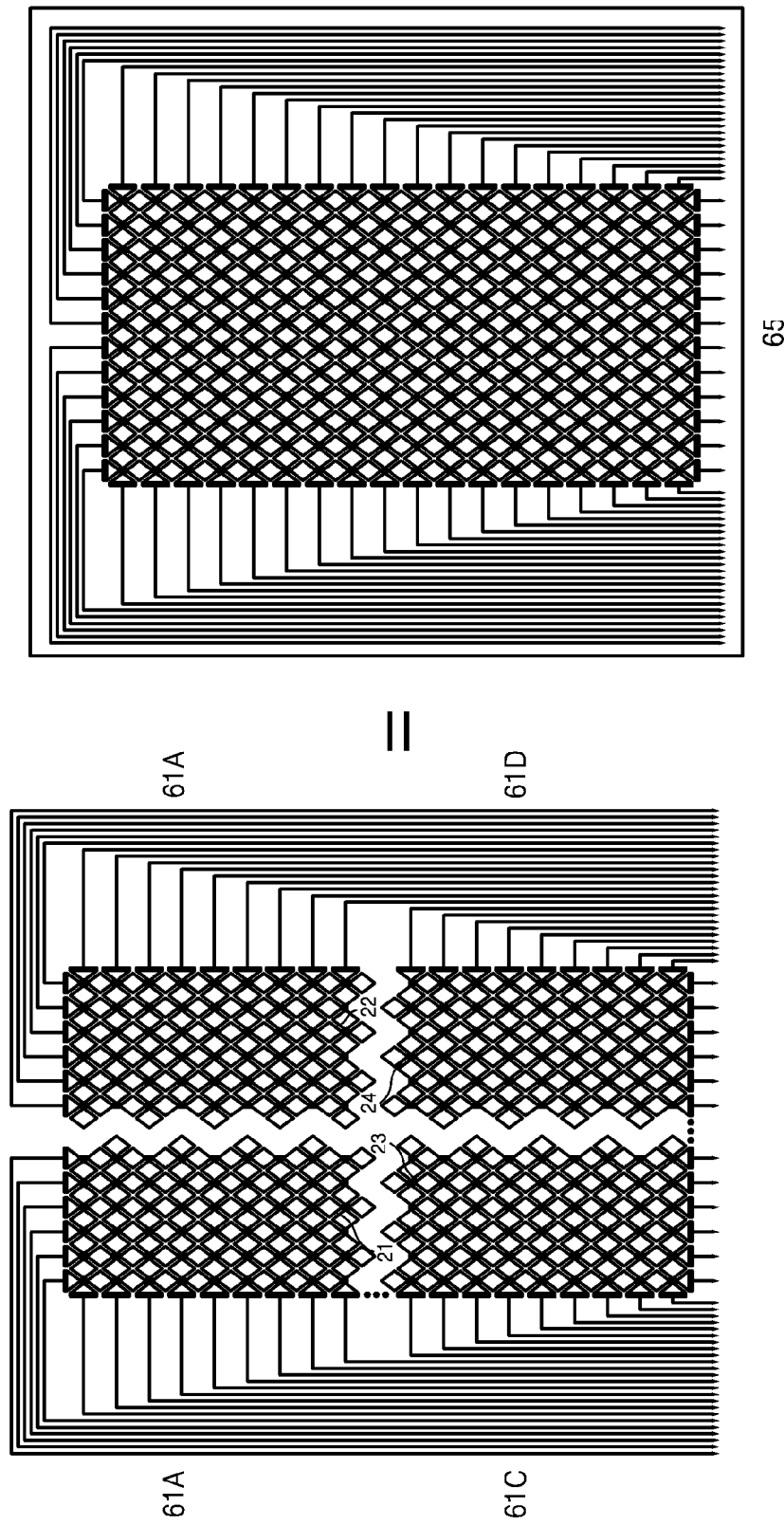

This result is remediated or mitigated in the embodiment of FIG. 7B by the use of TSP sections 61A, 61B, 61C and 61D having terminal edges with a non-linear shape. The resulting large size capacitive TSP 65 does not contain the visually objectionable lines 64A and 64B.

Figure 8:
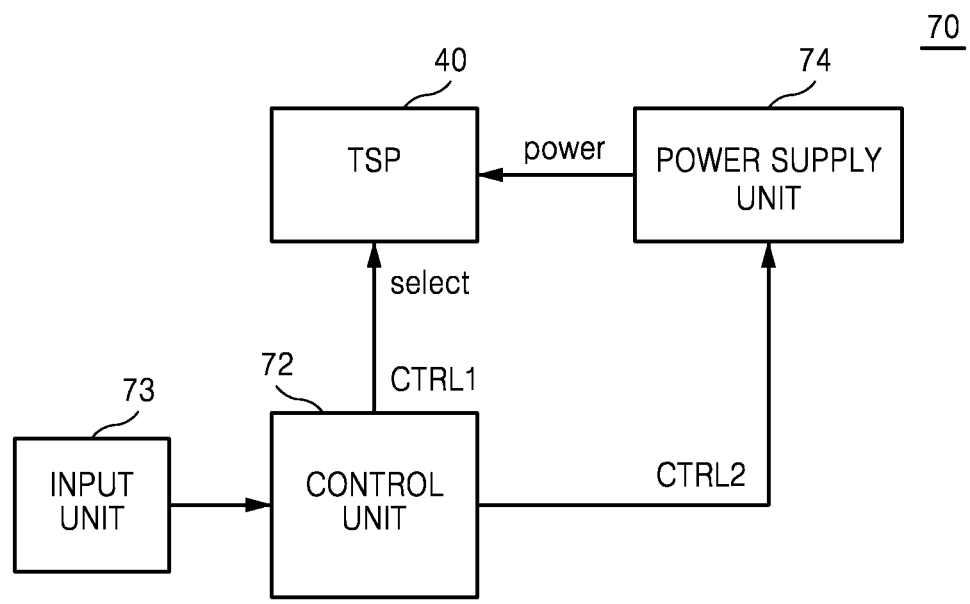
FIG. 8 is a control system configured for use with embodiments of the inventive concept.

FIG. 8 is a block diagram illustrating a control system 70 that may be used in conjunction with a large size capacitive TSP 40 according to an embodiment of the inventive concept. The embodiment of FIG. 8 will be described with reference to the embodiment illustrated in FIG. 5.

Control system 70 generally comprises an input unit 73, a control unit 72 and a power supply unit 74. In certain embodiments of the inventive concept, input unit 73 and control unit 72 may be implemented within an otherwise conventional touch screen panel controller or a host controller. In other embodiments of the inventive concept, these circuits may be separately implemented from the touch screen panel controller and host controller. Input unit 73 provides GUI display location data to controller 72. For example, the capacitive TSP 40 is assumed to be operated in response to touch data received in relation to GUI 15 wholly displayed within the fourth TSP section 40D. Based on this particular GUI display location data provided by input unit 73, controller 72 generates first and second control signals CTRL1 and CTRL2. The first control signal CTRL1 is provided to capacitive TSP 40 to independently select the fourth TSP section 40D from the plurality of TSP sections forming the capacitive TSP 40. Individual TSP section selection in response to the first control signal CTRL1 may include, for example, resetting base circuitry configurations and/or initializing certain data within the selected TSP section.

The second control signal CTRL2 provided by the control unit 72 is applied to power supply unit 74. It is assumed that power supply unit 74 is capable of independently applying or interrupting the application of power to each one of the plurality of TSP sections forming the capacitive TSP 40. The independent provision or interruption of power to various TSP sections by power supply unit 74 may be accomplished using a number of conventionally understood means, such as selective power line switching, etc.

In the illustrated embodiment of FIG. 8, the combination of the selection of the fourth TSP section 40D in response to the first control signal CTRL1 and the application of power to the fourth TSP section 40D in response to the second control signal CTRL2 results in the "activation" of the fourth TSP section 40D. Under these control signal conditions, the first through third TSP section 40A, 40B and 40C remain deactivated.

Other embodiments of the inventive concept may activate/deactivate identified TSP section(s) in response to GUI display location data received from input unit 73 using different kinds of control signals and/or activating/deactivating circuits. In this regard, control signals may take one of many different and conventionally understood forms. Single end or differential control signals may be used. A single signal line or a signal line bus may be used to communicate single bit or multiple bit control signals as the first and second control signals described above.

However, in the embodiment illustrated in FIGS. 5 and 8, the fourth TSP section 40D of the capacitive TSP 40, as selected and powered in response to the first and second control signals CTRL1 and CTRL2, is enabled to receive touch data at the first location(s) 17 associated with displayed GUI 15. Any unintended touches occurring at the second location(s) 19 within the first TSP section 40A and/or the third TSP section 40C are completely irrelevant to the successful operation of the capacitive TSP 40, since these TSP sections are deactivated (i.e., neither selected nor powered). Thus, unintended touches occurring in the first TSP section 40A and/or the third TSP section 40C are incapable of generating erroneous touch data that must be discriminated from the coincidentally occurring sequence of intended touches occurring at the first location(s) 17 within the fourth TSP section 40D.

Figure 9:
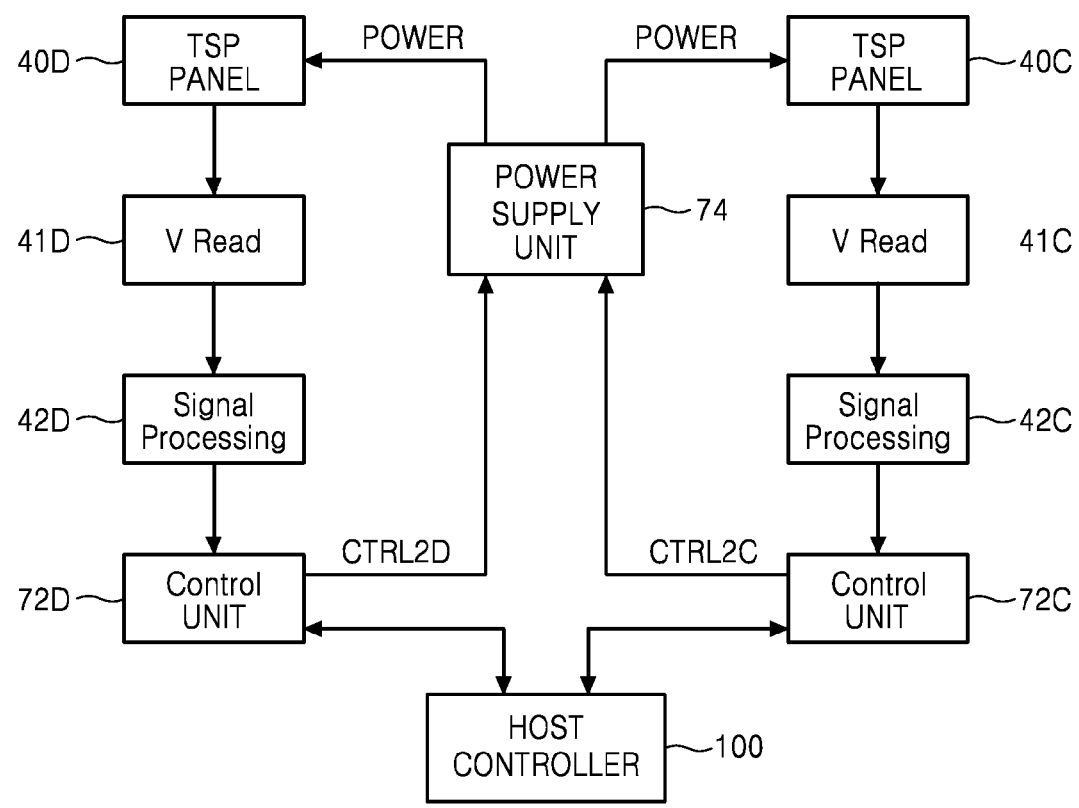
FIG. 9 is another control system configured for use with embodiments of the inventive concept.

FIG. 9 is a block diagram illustrating another control system 76 that may be used in conjunction with a large size capacitive TSP 40 according to an embodiment of the inventive concept. This embodiment extends the foregoing teachings and will be described in relation to the embodiments illustrated in FIGS. 5 and 8.

Only two of the four TSP sections forming the large size capacitive TSP of FIG. 5 are illustrated in FIG. 9, but the other non-illustrated TSP sections may be similarly controlled. Capacitive touch data signals from the fourth TSP section 40D are communicated to a voltage (V) read circuit 41D via (e.g.,) various conductive X/Y direction lines. The V read circuit 41D may be of conventional design, but essentially identifies touch data generated within the fourth TSP section 40D and provides corresponding touch data signals to signal processing circuit 42D. The signal processing circuit 42D may include, for example, analog to digital conversion circuitry of conventional design in order to generate coherent touch data from the received touch data signals. The touch data may then be communicated from the signal processing circuit 42D to a control unit 72D dedicated to the control of the fourth TSP section 40D. Control unit 72D also receives various information (e.g., GUI display location data) from host control 100 and provides the touch data to the host controller 100.

Based on the GUI display location data (or other types of data) received from the host controller 100, the control unit 72D determines whether or not to activate/deactivate the fourth TSP section 40D. An appropriate and corresponding second control signal CTRL2D is thus applied to power supply unit 74 to control the application of power to the fourth TSP section 40D.

The third TSP section 40C (and other TSP sections) are similarly controlled with respective control signals being generated by dedicated control units 72B through 72D in response to information received from the host controller 100. Naturally, the respective voltage read circuits, signal processing circuits, and/or control units may be integrated in one or more common circuits according to overall design constraints placed upon the host device.

The embodiment illustrated in FIG. 10 assumes a large size capacitive TSP similar to the one described above in relation to FIG. 5 that comprises four TSP sections 40A, 40B, 40C and 40D. Here, however, a virtual keyboard GUI 80 is displayed across a much larger portion 83 of the unitary user interface area. This larger portion 83 of the unitary user interface area extends across the entirety of the third TSP section 40C and the fourth TSP section 40D. Thus, the third TSP section 40C and the fourth TSP section 40D are activated while the first TSP section 40A and the second TSP section 40B remain deactivated. The length and breadth of the unitary user interface area provided by the embodiment of FIG. 10 allows a much larger virtual keyboard to be displayed than may be realized by conventional capacitive TSPs. This larger virtual keyboard is much more user-friendly than the very small virtual keyboards provided by conventional capacitive TSPs.

It has previously been assumed for purposes of simplicity that individual TSP sections may be activated/deactivated on a whole unit-by-whole unit basis. However, this need not always be the case. For example, the selection of and provision of power to only a defined portion of one or more TSP sections within embodiments of the inventive concept is certainly possible, provided some additional control complexity is well tolerated within the host device. For example, the large size capacitive TSP 40 shown in FIG. 5A includes a collection of toolbars and control icons that normally appears in a standard PC screen header 42. This virtual PC header is visually implemented using one or more "static" GUIs. A static GUI may be changed in its composition (i.e., like conventional toolbars used in PC word processing applications), but will normally be "always on" and will be displayed in a certain portion of the unitary user interface area. For certain applications being executed on a host device, a virtual keyboard may be one type of static GUI. In contrast, a "dynamic" GUI is only transiently displayed and may be readily moved or manipulated by the user within the unitary user interface area. A pull-down menu or a number-pad are examples of common dynamic GUIs.

To accommodate the provision of a virtual PC header or similar static GUI, for example, the selection and provision of power to an upper portion of the first and second TSP sections 40A and 40B may be provided. That is, a certain number of upper rows in the first and second TSP sections 40A and 40B may be configured for control to be "always ON" during execution of a particular application. At the same time, the remaining lower rows in the first and second TSP sections 40A and 40B may be dynamically controlled as described above. This is but one example of intra-TSP section partitioning for purposes of activation/deactivation control. Vertically oriented, static GUIs may be similarly provided during execution of an application by partitioning the activation/deactivation control of selected columns in one or more TSP sections.

Figure 11A:
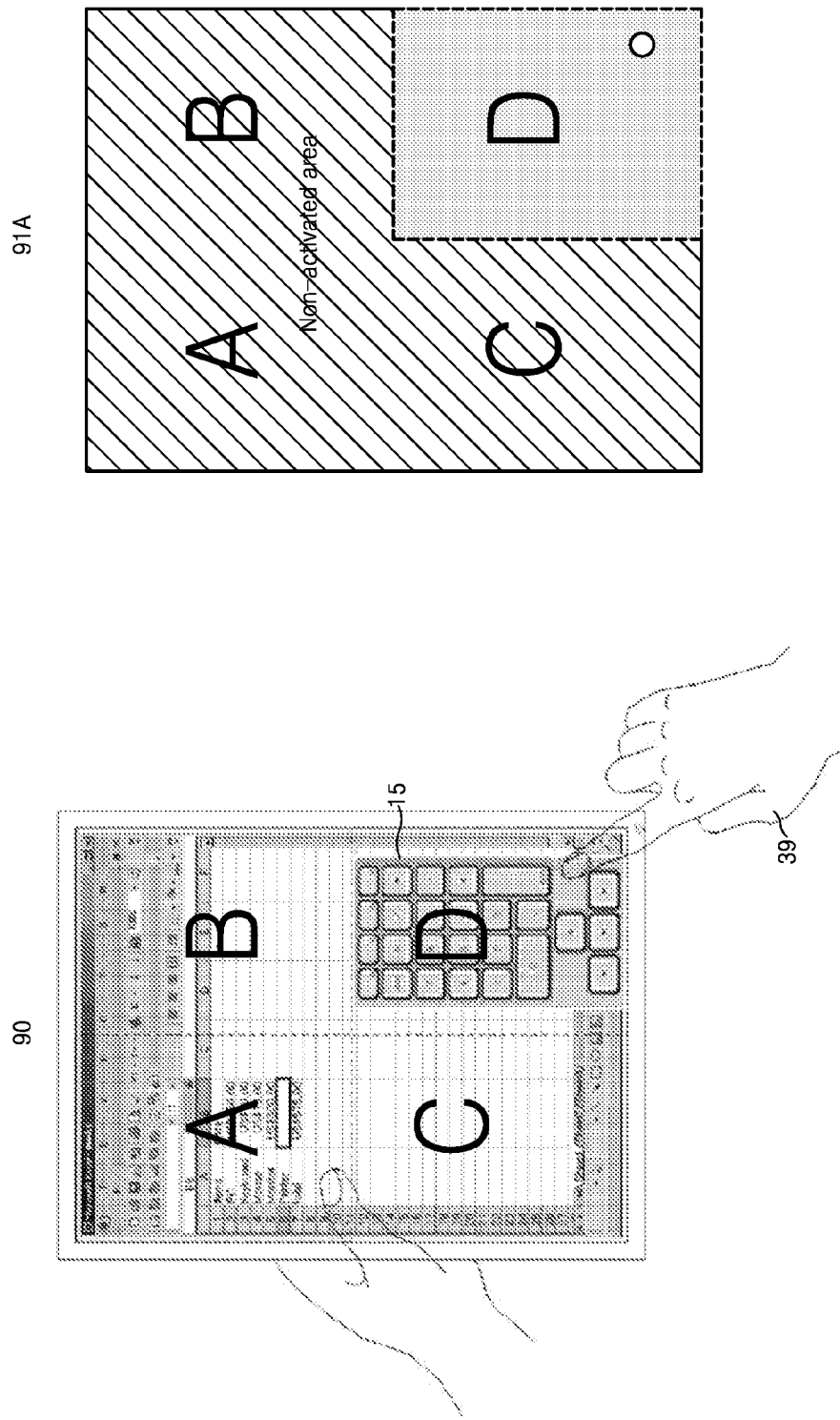
FIG. 11 illustrates a capacitive TSP assembled from a plurality of TSP sections in accordance with other embodiments of the inventive concept and conceptually illustrating a GUI drag and drop operation within the context of an embodiment of the inventive concept.
Figure 11C:
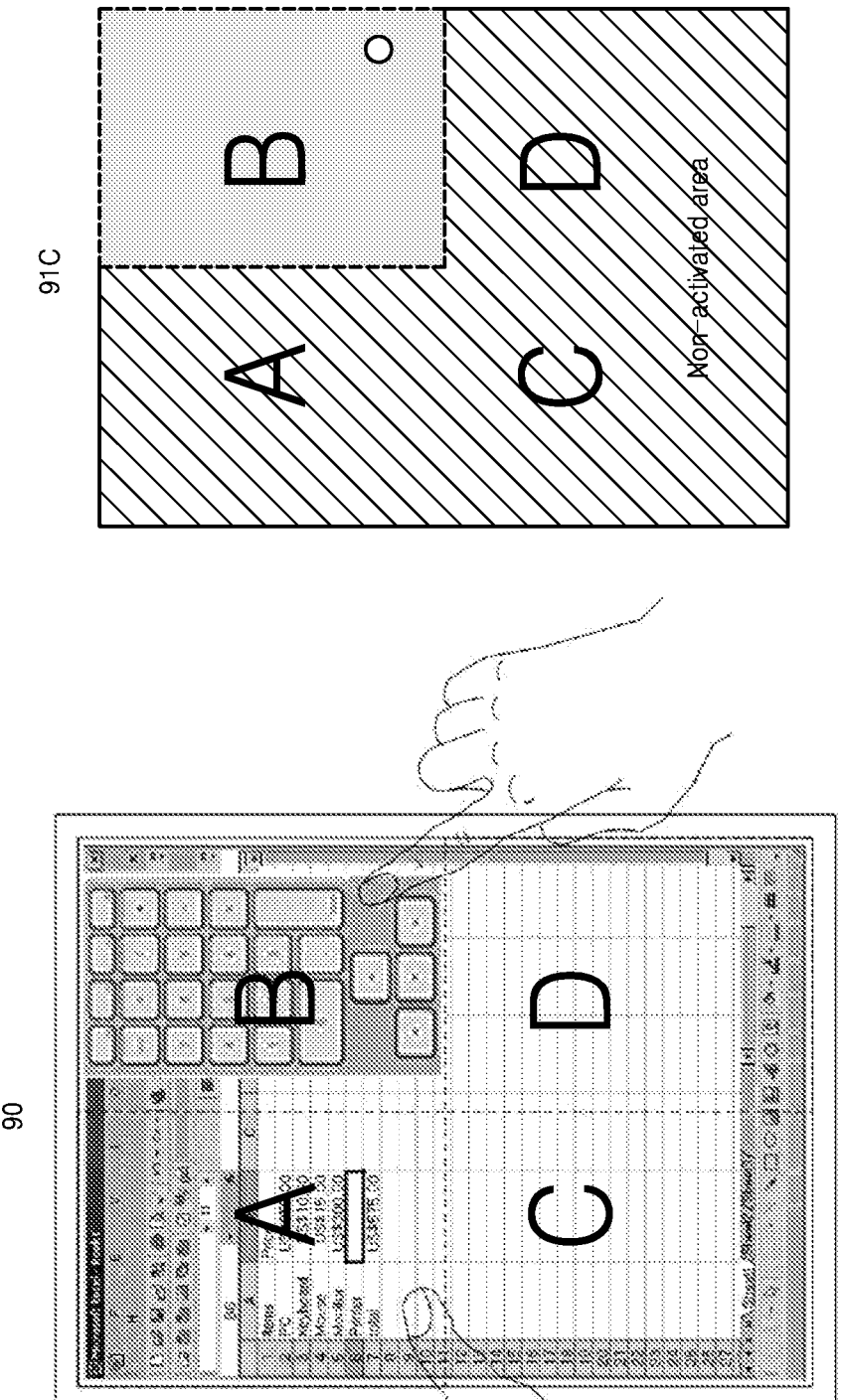

The embodiments illustrated in FIG. 11, collectively FIGS. 11A, 11B and 11C, further illustrate a control method that enables a GUI to be repositioned within the unitary user interface area of a capacitive TSP in response to user-defined touch data. The dynamic repositioning of a GUI (e.g., the execution of a drag and drop operation) on a device display is a well known feature provided by many digital information systems. Since this feature has become a basic user expectation, embodiments of the inventive concept include an ability to dynamically reposition a GUI on a large size capacitive TSP in response to user-defined touch data.

Like FIG. 5A, FIG. 11A illustrates a capacitive TSP 90 formed by the assembly of four (4) TSP sections 90A, 90B, 90C and 90D. In its initial operating state, the capacitive TSP 90 activates only the fourth TSP section 40D in relation to a displayed GUI 15. It is now assumed that the user is not comfortable with this initial placement of the GUI 15 and that he/she wishes to move it vertically upward within the unitary user interface area. Thus, using appropriately placed touch data the user indicates to a constituent display controller that the GUI 15 should be moved from the fourth TSP section 40D into the second TSP section 40B.

Hence, in FIG. 11B the second TSP section 40B is activated upon receiving an indication that at least a portion of the GUI 15 is now being displayed within its boundaries. The majority of the GUI 15, however, remains displayed within the boundaries of the fourth TSP section 40D, and so the fourth TSP section 40D remains activated as shown in 91B of FIG. 11B.

As the user continues to drag the GUI 15 from the fourth TSP section 40D to the second TSP section 40B, the fourth TSP section 40D is eventually deactivated once no portion of the GUI 15 is displayed within its boundaries as shown in 91C of FIG. 11C.

Because individual TSP sections are only activated when at least a portion of a currently active GUI is displayed within its boundaries, power consumption for the capacitive TSP is reduced. Yet, a greatly expanded unitary user interface area is provided to accommodate more and larger GUIs.

In effect, certain embodiments of the inventive concept provide a method of receiving user-defined touch data in a system comprising a capacitive TSP incorporating a plurality of TSP sections assembled in a planar arrangement to provide an expanded unitary user interface area. The method of operation may be implemented by one or more of the controllers identified in relation to the embodiments described in relation to FIGS. 8 and 9, for example.

A control unit associated with one or more of the plurality of TSP sections receives input data defining a region of permissible user touch input. Such "input data" may take many forms but in certain embodiments of the inventive concept the input data will include GUI display location data. The region (or first region) of permissible user touch input will be defined in accordance with the input data and will correspond with at least one of the plurality of TSP section. For example, the GUI 15 shown in FIG. 5 will result in the provision of input data from (e.g.) a TSP controller or a host controller identifying a region of permissible user touch input that corresponds to the fourth TSP section 40D.

The controller configured to control the operation of the fourth TSP section 40D will now activate the fourth TSP section in response to the identification of the region of permissible user touch input. All other TSP sections will remain deactivated or become deactivated since they are not identified by the input data and do not correspond to the region of permissible user touch input.

Embodiments of the inventive concept recognize that conventionally available materials and manufacturing techniques ultimately yield a capacitive TSP having a practical maximum width "W". The maximum width W for a capacitive TSP, which is correlated to the diagonal measurement "d" shown in FIG. 2 and which fully defines the size of a corresponding unitary user interface area, is a function of a maximum driving distance for a touch sensing signal across each constituent row line within the capacitive TSP. And while future improvements in materials and manufacturing techniques may yield larger and larger capacitive TSPs, some maximum width for each capacitive TSP design will remain bounded by this inherent functional limitation.

Figure 12:
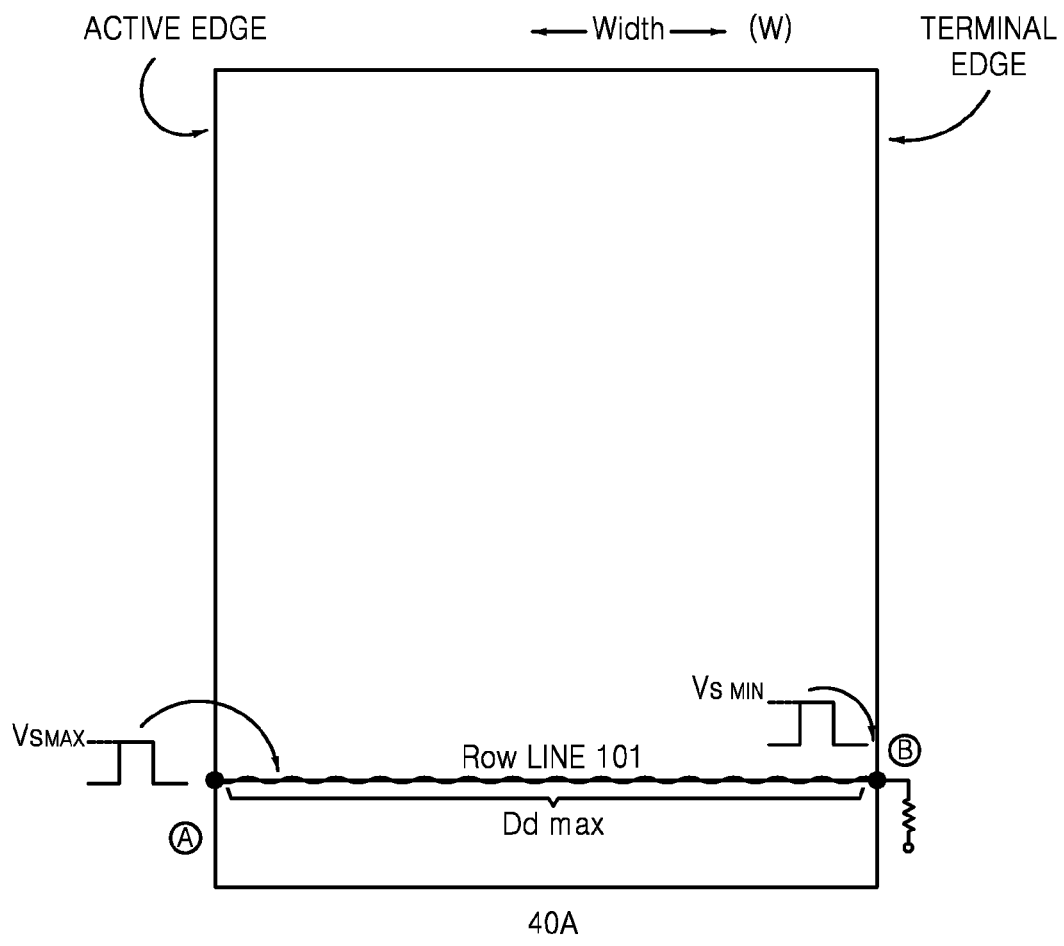
FIG. 12 is a conceptual drawing illustrating the TSP size limitations imposed by a maximum sensing signal driving distance associated with a row line.

FIG. 12 is a conceptual illustration of this limitation. In FIG. 12, the first TSP section 40A of FIG. 5 is assumed to be as large and as wide as current materials and manufacturing techniques will practically allow. Thus, absent the assembly of multiple TSP sections as taught by the subject inventive concept, the width W of the first TSP section 40A would exactly define the maximum width of the entire capacitive TSP and its unitary user interface area. As conceptually illustrated, the maximum practical width of the first TSP section 40D is a function of "how far" a row line 101 may effectively and coherently communicate a touch sensing signal which is ultimately interpreted as touch data by the constituent host device.

This distance may be understood as a physical row line length between a first point "A" on an active edge of the TSP section and a second point "B" on an opposing terminal edge of the TSP section across which a coherent touch sensing signal may be successfully communicated. While row line configurations and detection circuitry capabilities will vary by design, some practical range of maximum sensing signal level ($V_{SMAX}$) and minimum sensing signal level ($V_{SMIN}$) may be defined in relation to a maximum sensing signal driving distance ($D_{dmax}$) for the row line 101. It is this maximum sensing signal driving distance ($D_{dmax}$) that ultimately defines how wide a conventional capacitive TSP may be fabricated.

Those of ordinary skill in the art will understand how the same factors ultimately determine the maximum height of a capacitive TSP in relation to its constituent column lines.

However, by assembling a plurality of maximally wide and/or maximally high TSP sections into a large size capacitive TSP, a significantly larger unitary user interface area may be provided to accommodate more and larger GUIs. Alternately, less than maximally wide and high individual TSP sections having better touch sensing signal margins may be assembled according to an embodiment of the inventive concept to yield a large sized capacitive TSP having a significantly larger unitary user interface area. Yet, all of these embodiments additionally allow for improved control over the power consumed by the assembled TSP sections by independently activating/deactivating selected TSP sections in relation, for example, to displayed GUI(s).

Figure 13:
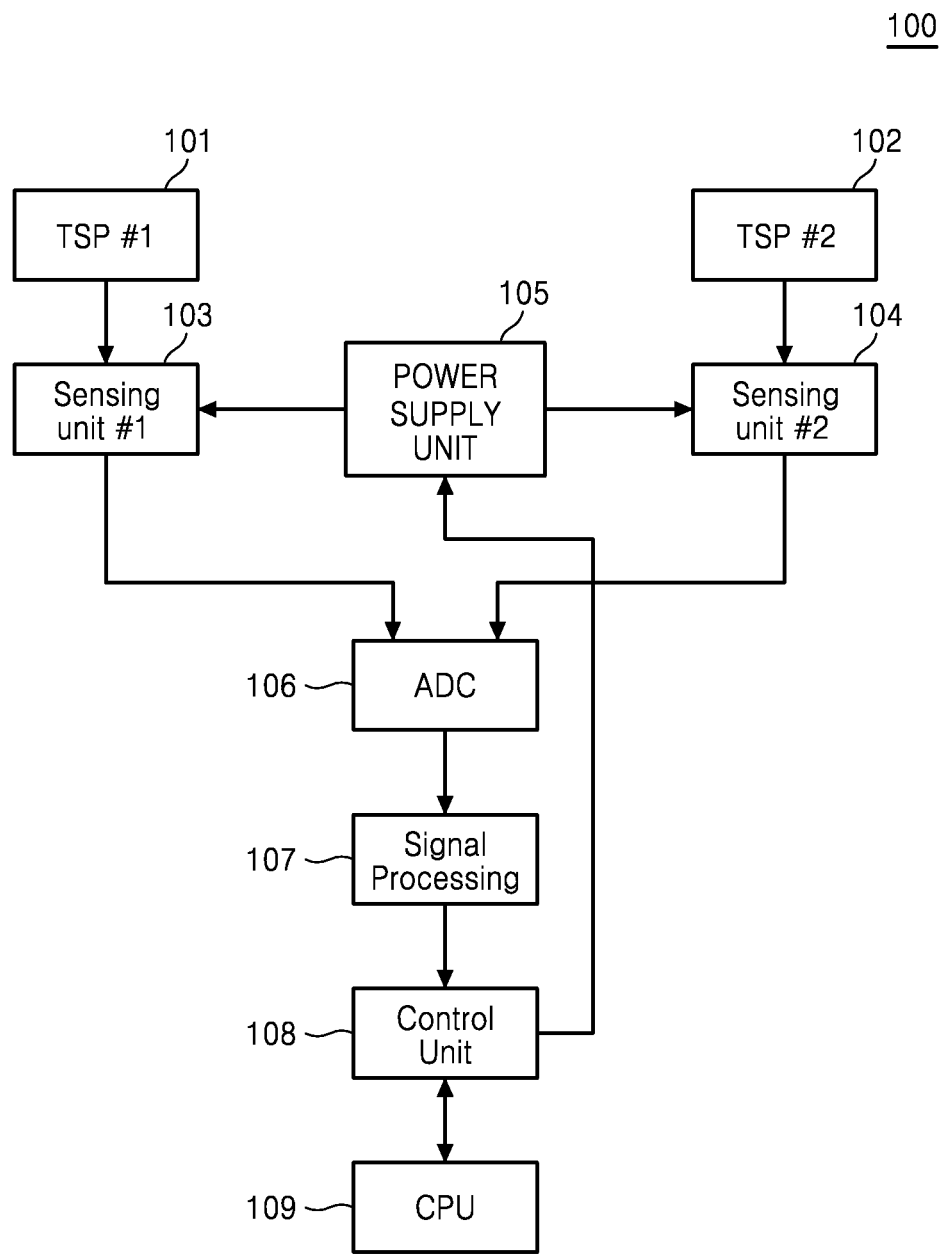
FIG. 13 is a system block diagram further illustrating a large TSP according to an embodiment of the inventive concept.
Figure 14:
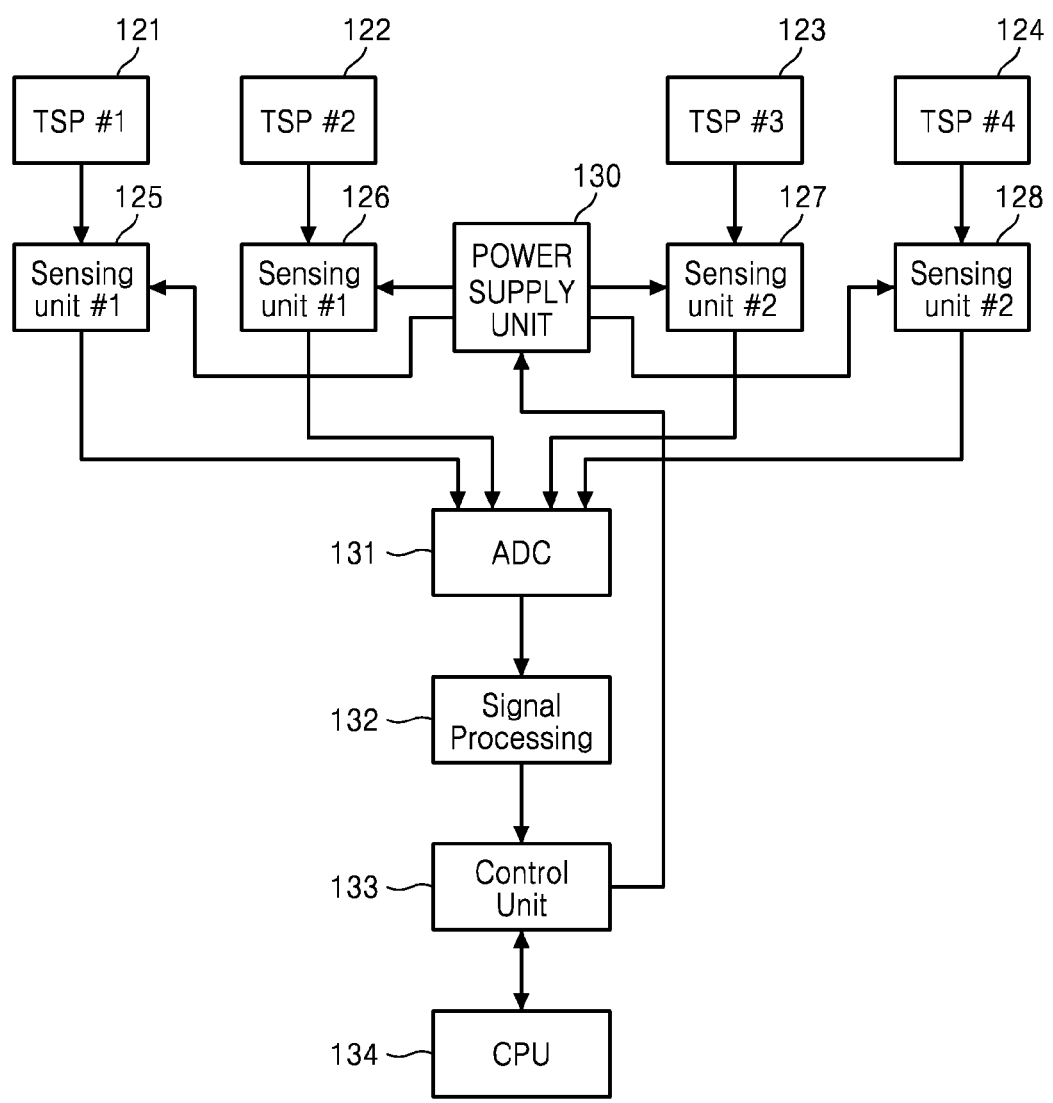
FIG. 14 is a system block diagram further illustrating another large TSP according to an embodiment of the inventive concept.

The foregoing embodiments, such as those described in relation to FIGS. 6A, 6B, 7A, and 7B encompass large size, panel-type, capacitive TSPs assembled from multiple (e.g., 2 or 4) TSP sections. Those skilled in the art will recognize that the multiple TSP sections (e.g., 50A, 50B, 52A, 52B, 60A, 60B, 60C, 60D, 61A, 61B, 61C, and 61D) mechanically assembled and electrically connected to form the large size capacitive TSPs contemplated by embodiments of the inventive concept must be effectively controlled as a collective in order for the large size TSP to operate as a "single screen" display for the user. FIGS. 13 and 14 are block diagrams illustrating possible control systems for large size capacitive TSPs assembled from multiple TSP sections.

For example, the large size capacitive TSP 100 of FIG. 13 is assembled from first and second TSP sections 101 and 102. Bearing in mind the practical limitations discussed in relation to FIG. 12, each of the first and second TSP sections 101 and 102 is operatively associated with respective first and second sensing units 103 and 104. The first and second sensing units 103 and 104 are powered by a common power supply unit 105 controlled by a TSP control unit 108. The first and second sensing units 103 and 104 provide sense information derived from user touch data respectively entered through the first and second TSP sections 101 and 102. The collective sense information is then passed to a signal processing unit 107 after being converted from analog waveforms to corresponding digital data by analog-to-digital converter (ADC) 106. The resulting sense data may then be passed, post-processing, to TSP control unit 108. The TSP control unit 108 cooperates with a central processing unit (CPU) 109 of the display device incorporating the large size capacitive TSP 100 to enable user defined touch data to control the display of image data.

IN similar manner, the large size capacitive TSP 120 of FIG. 14 is assembled from first, second, third and fourth TSP sections 121, 122, 123, and 124. Again, bearing in mind the practical limitations discussed in relation to FIG. 12, each of the first through fourth TSP sections 121, 122, 123, and 124 is operatively associated with respective first through fourth sensing units 125, 126, 127, and 128. The first through fourth sensing units 125, 126, 127, and 128 may again be powered by a common power supply unit 130 controlled by a TSP control unit 133. The first through fourth sensing units 125, 126, 127 and 128 provide sense information derived from user touch data respectively entered through the first through fourth TSP sections 121, 122, 123, and 124. The collective sense information is then passed to a signal processing unit 132 after being converted from analog waveforms to corresponding digital data by analog-to-digital converter (ADC) 131. The resulting sense data may then be passed, post-processing, to TSP control unit 133. As before, the TSP control unit 133 is configured to cooperate with a central processing unit (CPU) 134 of the display device incorporating the large size capacitive TSP 100 to enable user defined touch data to control the display of image data.

While exemplary embodiments of the inventive concept have been particularly shown and described above, it is understood that various changes in form and detail may be made therein without departing from the scope of the following claims.

What is claimed is:

1. A capacitive touch screen panel (TSP), comprising: a plurality of TSP sections assembled in a planar arrangement to provide a unitary user interface area, wherein each one of the plurality of TSP sections is configured for independent activation/deactivation with respect to other ones of the plurality of TSP sections,
and each one of the plurality of TSP sections comprises:
an active vertical edge configured to transfer touch sensing signals on row lines extending across the TSP section to an external signal processing circuit, and a terminal vertical edge configured for assembly with a terminal vertical edge of another one of the plurality of TSP sections;
an active horizontal edge configured to transfer touch sensing signals on column lines extending across the TSP section to the external signal processing circuit, and a terminal horizontal edge configured for assembly with a terminal horizontal edge of another one of the plurality of TSP sections; and
wherein the plurality of TSP sections comprises first, second, third and fourth TSP sections assembled in a quadrature planar arrangement, the first and second TSP sections being connected via respective terminal vertical edges and the third and fourth TSP sections being connected via respective terminal vertical edges, and the first and third TSP sections being connected via respective terminal horizontal edges and the second and fourth TSP sections being connected via respective terminal horizontal edges.

2. The capacitive TSP of claim 1, wherein each one of the respective terminal vertical edges and terminal horizontal edges has a linear shape.

3. The capacitive TSP of claim 1, wherein each one of the respective terminal vertical edges and terminal horizontal edges has a zigzag shape.

4. The capacitive TSP of claim 1, further comprising:
a control unit configured to receive graphical user interface (GUI) display location data and generate a control signal to activate/deactivate at least one of the plurality of TSP sections in response to the GUI display location data.

5. The capacitive TSP of claim 4, further comprising:
a power supply unit configured to independently apply power to each one of the plurality of TSP sections in response to the control signal.

6. The capacitive TSP of claim 5, wherein the control signal comprises a first control signal selecting the at least one of the plurality of TSP sections, and a second control signal enabling the power supply unit to apply power to the at least one of the plurality of TSP sections.

7. The capacitive TSP of claim 1, further comprising:
a first control unit configured to receive graphical user interface (GUI) display location data and generate a first control signal to activate/deactivate the first TSP section in response to the GUI display location data;
a second control unit configured to receive the GUI display location data and generate a second control signal to activate/deactivate the second TSP section in response to the GUI display location data;
a third control unit configured to receive the GUI display location data and generate a third control signal to activate/deactivate the third TSP section in response to the GUI display location data; and
a fourth control unit configured to receive the GUI display location data and generate a fourth control signal to activate/deactivate the fourth TSP section in response to the GUI display location data.

8. The capacitive TSP of claim 7, further comprising:
a power supply unit configured to independently apply power to each one of the first, second, third and fourth TSP sections in response to the first, second, third and fourth control signals, respectively.

9. A method of receiving user-defined touch data in a system comprising a capacitive touch screen panel (TSP) incorporating a plurality of TSP sections assembled in a planar arrangement to provide a unitary user interface area having a first area, the method comprising:
receiving input data defining a first region of permissible user touch input having a second area within the unitary user interface area, wherein the second area is less than the first area; and
activating a first TSP section among the plurality of TSP sections in response to the definition of the first region of permissible user touch input while a second TSP section among the plurality of TSP sections is deactivated.

10. The method of claim 9, wherein activating the first TSP section comprises applying power to the first TSP section.

11. The method of claim 9, wherein the first region of permissible user touch input displays at least in part a first Graphical User Interface (GUI).

12. The method of claim 11, further comprising:
receiving user touch data via the first GUI that defines a second region of permissible user touch input within the unitary user interface area; and
activating the second TSP section in response to the defined second region of permissible user touch input.

13. The method of claim 12, wherein the second region of permissible user touch input displays at least in part a second GUI, such that the second GUI is displayed within at least some portion of the first and second TSP sections.

14. The method of claim 13, further comprising:
- receiving additional user touch data via the second GUI and defining a third region of permissible user touch input within the unitary user interface area; and
- deactivating at least one of the first TSP section and the second TSP section in response to the defined third region of permissible user touch input.

15. The method of claim 14, wherein the third region of permissible user touch input displays a third GUI wholly within only one of the first and second TSP sections.

16. The method of claim 11, wherein the first GUI includes at least one of a virtual keyboard, a command menu, a file list, and a number-pad.

17. The method of claim 9, wherein the unitary user interface area has a first width and each one of the plurality of TSP sections has a width less than the first width.

* * * * *